United States Patent
Modarresifar

(10) Patent No.: US 11,554,991 B2
(45) Date of Patent: Jan. 17, 2023

(54) THERMAL INSULATION

(71) Applicant: Thermal Ceramics UK Limited, Merseyside (GB)

(72) Inventor: Farid Modarresifar, Merseyside (GB)

(73) Assignee: Thermal Ceramics UK Limited, Merseyside (GB)

( * ) Notice: Subject to any disclaimer, the term of this patent is extended or adjusted under 35 U.S.C. 154(b) by 0 days.

(21) Appl. No.: 17/506,984

(22) Filed: Oct. 21, 2021

(65) Prior Publication Data

US 2022/0127152 A1    Apr. 28, 2022

(30) Foreign Application Priority Data

Oct. 23, 2020 (GB) ................................. 2016878
Nov. 13, 2020 (GB) ................................. 2017916
Mar. 5, 2021 (GB) ................................. 2103109

(51) Int. Cl.
| | |
|---|---|
| *C01B 33/24* | (2006.01) |
| *E04B 1/78* | (2006.01) |
| *D01F 9/08* | (2006.01) |
| *C04B 37/00* | (2006.01) |
| *F27D 1/00* | (2006.01) |
| *D01D 1/04* | (2006.01) |
| *D01D 5/08* | (2006.01) |

(52) U.S. Cl.
CPC ............ *C04B 37/001* (2013.01); *C01B 33/24* (2013.01); *D01D 1/04* (2013.01); *D01D 5/08* (2013.01); *D01F 9/08* (2013.01); *E04B 1/78* (2013.01); *F27D 1/0003* (2013.01); *C01P 2002/52* (2013.01); *C01P 2002/60* (2013.01); *C01P 2004/03* (2013.01); *C01P 2006/32* (2013.01); *C01P 2006/37* (2013.01); *C04B 2237/341* (2013.01); *D10B 2101/02* (2013.01)

(58) Field of Classification Search
CPC ... C03C 13/06; C03C 2213/02; C04B 37/001; C04B 2237/341; C01B 33/24; D01F 9/08; E04B 1/78; F27D 1/0003; C01P 2002/52; C01P 2002/60; C01P 2004/03; C01P 2006/32; C01P 2006/37; D10B 2101/02; D04H 1/4209

See application file for complete search history.

(56) References Cited

U.S. PATENT DOCUMENTS

| | | | |
|---|---|---|---|
| 5,332,699 A | * | 7/1994 | Olds ....................... C03C 25/68 501/36 |
| 5,714,421 A | | 2/1998 | Olds et al. |

(Continued)

FOREIGN PATENT DOCUMENTS

| | | |
|---|---|---|
| GB | 2510739 A | 8/2014 |
| JP | 2000220037 A | 8/2000 |

(Continued)

*Primary Examiner* — Karl E Group
*Assistant Examiner* — Cameron K Miller
(74) *Attorney, Agent, or Firm* — Servilla Whitney LLC

(57) ABSTRACT

The present invention relates to inorganic fibres having a composition comprising:
  61.0 to 70.8 wt % $SiO_2$;
  28.0 to 39.0 wt % $CaO$;
  0.10 to 0.85 wt % $MgO$
  other components, if any, providing the balance up to 100 wt %,
The sum of $SiO_2$ and $CaO$ is greater than or equal to 98.8 wt % and the other components comprise less than 0.70 wt % $Al_2O_3$, if any.

22 Claims, 9 Drawing Sheets

(56) References Cited

U.S. PATENT DOCUMENTS

| | | |
|---|---|---|
| 7,259,118 B2 | 8/2007 | Jubb et al. |
| 10,894,737 B2 | 1/2021 | Hankinson et al. |
| 2004/0254056 A1* | 12/2004 | Jubb ................. C03C 13/06 501/36 |
| 2012/0100983 A1 | 4/2012 | Yonaiyama et al. |
| 2014/0134444 A1 | 5/2014 | Ochi et al. |

FOREIGN PATENT DOCUMENTS

| | | |
|---|---|---|
| JP | 2002266169 A | 9/2002 |
| JP | 2005514318 A | 5/2005 |
| JP | 2006152468 A | 6/2006 |
| JP | 2012102450 A | 5/2012 |
| JP | 2013071363 A | 4/2013 |
| JP | 2013136848 A | 7/2013 |
| JP | 2019503328 A | 2/2019 |
| WO | 8705007 A1 | 8/1987 |

\* cited by examiner

THERMAL INSULATION

CROSS-REFERENCE TO RELATED APPLICATIONS

This application claims priority to United Kingdom Application No. 2016878.7, filed Oct. 23, 2020, United Kingdom Application No. 2017916.4, filed Nov. 13, 2020, and United Kingdom Application No. 2103109.1, filed Mar. 5, 2021, the entire disclosures of which are hereby incorporated by reference herein.

FIELD OF THE INVENTION

This invention relates to thermal insulation comprising bio-soluble inorganic fibre compositions and more particularly insulation materials comprising said fibre. The invention also relates to the use of said fibre at temperatures in excess of 1200° C.

BACKGROUND

The insulation material industry has determined that it is desirable to utilize fibres in thermal, electrical and acoustical insulating applications, which do not persist in physiological fluids. That is, fibre compositions which are considered have low biopersistence (i.e. bio-soluble) in physiological fluids.

While candidate silicate materials have been proposed, the use temperature limit of these materials have not been high enough to accommodate many of the applications to which high temperature resistant fibres are applied. For example, such bio-soluble fibres exhibit high shrinkage at use temperatures and/or reduced mechanical strength when exposed to use temperatures ranging from 1000° C. to 1500° C. as compared to the performance of refractory ceramic fibres.

The high temperature resistant fibres should exhibit minimal shrinkage at expected exposure temperatures, and after prolonged or continuous exposure to the expected use temperatures, in order to provide effective thermal protection to the article being insulated. In addition to bio-solublity and high temperature resistance the fibres should possess a low diameter and low shot content for the resultant insulation materials to have low density and thermal conductivity. The multitude of requirements do not end there, with fibres also needing to be non-reactive to other materials in the insulation system they may form part of.

In 1987 Manville Corporation developed bio-soluble high temperature resistant fibres based on a calcium magnesium silicate chemistry (U.S. Pat. No. 5,714,421). Such material not only had a higher temperature capability than traditional glass wools, but also had a higher solubility in body fluids than the aluminosilicate fibres mostly used for high temperature insulation. U.S. Pat. No. 5,714,421 taught the necessity to combine silica, calcia and magnesia with a variety of other metal oxide additives to obtain the desired combination of fibre properties and form.

While there are many commercial examples of the bio-soluble high temperature resistant fibres which have stemmed from magnesia, calcia, silica systems, there is still a need for improved bio-soluble high temperature resistant fibres and insulation material thereof.

International Application WO 87/05007 discloses inorganic fibres consisting essentially of $SiO_2$, CaO with specified ranges of MgO and $Al_2O_3$, which were obtained from metal oxides rather than raw by-product materials with variable composition. It was observed that lower $Al_2O_3$ levels resulted in a surprisingly high bio-solubility level.

International Application WO 94/15883 discloses CaO/MgO/$SiO_2$fibres with additional constituents $Al_2O_3$, $ZrO_2$, and $TiO_2$, for which saline solubility and refractoriness were investigated. The document states that saline solubility appeared to increase with increasing amounts of MgO, whereas $ZrO_2$ and $Al_2O_3$ were detrimental to solubility. The presence of $TiO_2$ (0.71-0.74 mol %) and $Al_2O_3$ (0.51-0.55 mol %) led to the fibres failing the shrinkage criterion of 3.5% or less at 1260° C. The document further states that fibres that are too high in $SiO_2$ are difficult or impossible to form, and cites fibres having 70.04, 73.09, 73.28 and 78.07 wt % $SiO_2$ as examples of compositions which could not be fiberized.

U.S. Pat. No. 6,953,757 discloses an inorganic high silica fibre composition comprising predominately silica, calcia, magnesia and zirconia and optionally viscosity modifiers, such as alumina and boria, to enable product fiberisation.

JP2003003335 disclosures the inorganic fibres comprising silica and calcia to avoid precipitation of cristobalite at the fibres are heated to 1000° C. or greater. To avoid precipitation of cristobalite, the levels of $Na_2O$, $K_2O$, $TiO_2$, $Fe_2O_3$ and MgO are reduced or not added, with high purity calcia and silica used as raw materials.

US2004/254056 claimed CaO/$SiO_2$ fibres comprising greater than or equal to 72 wt % $SiO_2$, or for which the sum $SiO_2$+$ZrO_2$+$B_2O_3$+5*$P_2O_5$ was greater than 72 wt %. Such fibres had a low propensity for reaction with aluminosilicate bricks whereas fibres with lower $SiO_2$+$ZrO_2$+$B_2O_3$+5*$P_2O_5$ content tended to react adversely with aluminosilicate bricks.

Despite advances in the field, there is still a need for a simplified fibre composition which is not reliant upon a range of additives to obtain the required combination of fibre properties and form. There is also a need for a simplified fibre composition which is not reliant on high impurity raw materials in their production, with the purification processes often used to produce such high purity raw materials increasing the carbon footprint of the resultant inorganic fibres.

SUMMARY OF THE INVENTION

The applicant has found that, contrary to received wisdom in the field of refractory alkaline earth silicate fibres, that refractory fibres with high utility are able to be produced without the addition of significant amounts of additives, such as viscosity modifiers, solubility or refractory enhancers, to a $SiO_2$-CaO system, within a specified compositional range.

According to a first aspect of the prevent invention there is provided inorganic fibres consisting:
  61.0 to 70.8 wt % $SiO_2$;
  28.0 to 39.0 wt % CaO;
  0.10 to 0.85 wt % MgO; and
  other components, if any, providing the balance up to 100 wt %,
wherein the sum of $SiO_2$ and CaO is greater than or equal to 98.8 wt % and the other components comprise less than 0.70 wt % $Al_2O_3$, if any.

The inorganic fibres may have a composition comprising:
  65.7 to 69.0 wt % $SiO_2$;
  30.0 to 34.2 wt % CaO;
  0.10 to 0.60 wt % MgO;
  0 to 0.50 wt % $Al_2O_3$; and
  the sum of $SiO_2$ and CaO is greater or equal to 99.0 wt %.

The inorganic fibres may have a composition comprising:
65.7 to 69.0 wt % $SiO_2$;
30.0 to 34.2 wt % CaO;
0.10 to 0.45 wt % MgO;
0 to 0.40 wt % $Al_2O_3$; and
the sum of $SiO_2$ and CaO is greater or equal to 99.2 wt %.

It has been found that there is a narrow compositional window in which a small amount of MgO unexpectedly inhibits the formation of surface crystallite grains at high temperatures, whilst not adversely affecting the high temperature performance of the fibres. Large surface crystallite grains on fibres may result in the creation of stress points which adversely affects the mechanical properties of the fibres at high temperatures. Therefore, it is desirable to minimise the size of the surface crystallite phases formed at high temperatures when the fibres are in use.

The inorganic fibres which after heat treatment at 1100° C. for 24 hours preferably comprise surface crystal gains with an average crystallite size of 0.90 μm or less; or 0.80 μm or less; or 0.70 μm or less; or 0.60 μm or less; or 0.50 μm or less; or 0.40 μm or less.

According to a second aspect of the present invention, there is provided thermal insulation comprising such fibres.

According to a third aspect of the present invention, there is provided the use of such fibres at temperatures at or above 1200° C. or at or above 1260° C. or at or above 1280° C. Such use may be in applications requiring continuous resistance to temperatures of 1200° C. or more (e.g. a classification temperature of 1200° C. or 1260° C. or 1300° C. (EN 1094-1-2008)), the thermal insulation comprising such bio-soluble inorganic fibres with a diameter of less than 6.0 μm.

The amount of other components is typically at least 0.2 wt % or at least 0.3 wt % or at least 0.4 wt % or at least 0.5 wt %. While the use of more pure raw materials is possible, this is often accompanied with an increased carbon footprint and cost due to the need for additional purification processes. Further, these other components, which may include incidental impurities, are thought to assist with fiberisation of the composition.

In some embodiments, a small amount of additives may be included to fine-tune the properties of the fibres. Additive addition may be greater than 0.0 wt % or greater than 0.10 wt % or greater than 0.20 wt % or greater than 0.30 wt %. Additive addition may be less than 1.0 wt % or less than 0.8 wt % or less than 0.6 wt % or less than 0.4 wt % or less than 0.3 wt % or less than 0.2 wt % of the fibre composition.

In some embodiments, additives are added to assist in fiberisation (melt viscosity modifiers); to enhance high temperature performance; to facilitate the formation of finer fibre diameters whilst maintaining the required bio-solubility and high temperature usage characteristics.

The additives may include oxides or fluorides of one or more of the lanthanides series of elements (e.g. La, Ce), Li, Na, K, Sr, Ba, Cr, Fe, Zn, Y, Zr, Hf; Ca, B, P or combinations thereof. In another embodiment the other components comprise one or more oxides or fluorides of lanthanides, Sr, Ba, Cr, Zr or combinations thereof. The fibre composition may include 0.05 to 1.0 wt % additives or 0.10 to 0.80 wt % or 0.15 wt to 0.60 wt % additives. The additives are preferably sourced from a naturally occurring mineral deposit. The addition of viscosity modifiers is particularly advantageous when added to fibre compositions with a $SiO_2$ content of greater than 66.0 wt % or 67.0 wt % or 68.0 wt % or 69.0 wt %.

It has been found that within this compositional window, bio-soluble high temperature resistant fibres are melt formable. This is particularly surprising given the reported use of a variety of additives to modify the inorganic fibre composition characteristics, such that the fibres have utility at high temperatures. Additionally, when the fibre composition of 65.7 wt % or greater $SiO_2$ the fibre is also non-reactive in the presence alumina rich materials at high temperature.

In some embodiments, the inorganic fibres are non-reactive with an alumina rich composition (such as mullite) when exposed to 1200° C. for 24 hours. Alumina rich compositions preferably include compositions with at least 50 wt % $Al_2O_3$.

In some embodiments, other components comprise or consist of incidental impurities in the raw materials used to make the inorganic fibres, including coal ash, when coal is used as an energy source to melt in the inorganic fibre precursor material, such as silica sand and lime.

In some embodiments, the main impurity in lime comprises magnesia. Other impurities include alumina, iron oxide and alkali metal oxides, such as $K_2O$ and $Na_2O$.

In some embodiments the sum of $SiO_2$ and CaO is greater than or equal to 99.1 wt % or greater than or equal to 99.2 wt %.

In some embodiments, the sum of $SiO_2$ and CaO and MgO is greater or equal to 99.0 wt % or greater or equal to 99.1 wt % or greater or equal to 99.2 wt % or greater or equal to 99.3 wt % or greater or equal to 99.4 wt % or greater or equal to 99.5 wt % of the fibre composition. The inorganic fibre composition comprises less than 0.85 wt % or less than 0.80 wt % or less than 0.70 wt % or less than 0.6 wt % MgO or less than 0.50 wt % or less than 0.45 wt % MgO derived from the incidental impurities. Higher contents of MgO has been found to detrimentally affect the thermal stability of the fibres at 1300° C. The composition preferably comprises at least 0.11 wt % or at least 0.12 wt % or at least 0.14 wt % or at least 0.16 wt % or at least 0.18 wt % or at least 0.20 wt % MgO. Lower amounts of MgO may not sufficiently inhibit surface crystallite formation at elevated temperatures.

In some embodiment, the sum of $SiO_2$+CaO+MgO+$Al_2O_3$ is greater than or equal to 99.3 wt % or greater than or equal to 99.4 wt % or greater than or equal to 99.5 wt % or greater than or equal to 99.6 wt % or greater than or equal to 99.7 wt % of the fibre composition.

Preferably, inorganic fibre composition comprises 0.01 to less than 0.65 wt % $Al_2O_3$, or less than 0.60 wt % or less than 0.50 wt % or less than 0.40 wt % or less than 0.35 wt % or less than 0.30 wt % or less than 0.25 wt % $Al_2O_3$ derived from the incidental impurities. Within the current $SiO_2$-CaO composition, higher levels of $Al_2O_3$ have been found to adversely affect the bio-solubility and thermal stability of the inorganic fibres, in addition to promoting crystal growth at elevated temperatures.

In another embodiment, the sum of MgO and $Al_2O_3$ in the inorganic fibres is no more than 1.20 wt % or not more than 1.10 wt % or no more than 1.00 wt % or no more than 0.90 wt % or no more than 0.80 wt % or no more than 0.70 wt % or no more than 0.60 wt %.

In other embodiments, the inorganic fibre from which a vacuum cast preform of the fibre has a shrinkage of 5.0% or less (or 4.0% or 4.5% or less or 3.0% or less or 2.5% or 2.0% or less) when exposed to 1200° C. for 24 hours. In another embodiment, the inorganic fibres from which a vacuum cast preform of the fibre has a shrinkage of 5.0% or less (or 4.5% or 4.0% or less or 3.0% or less or 2.5% or 2.0% less) when exposed to 1300° C. for 24 hours.

The melting temperature of the inorganic fibres is preferably at least 1350° C. or at least 1380° C. or at least 1400° C. or at least 1420° C.

Preferably, the impurities of the raw materials is such that the sum of $SiO_2$ and CaO is greater or equal to 99.0 wt % or greater or equal to 99.3 wt % greater or equal to 99.4 wt % greater or equal to 99.5 wt % of the inorganic fibre composition. The upper limit of the purity is likely be constrained by the cost and availability of raw materials and/or the ability to manufacture inorganic fibres, particularly with fine fibre diameter (e.g. <6 μm and/or less than 52 wt % shot (<45 m)).

To aid fiberisation, in the absence of additives, the $SiO_2$ content of the inorganic fibre composition is preferably less than 70.7 wt % or less than 70.6 wt % or less than 70.4 wt % or less than 70.0 wt % or less than 69.5 wt % or less than 69.0 wt % or less than 68.5 wt % or less than 68.0 wt %. To aid resiliency at high temperature and minimise reactivity with alumina containing substrates, the $SiO_2$ content of the inorganic fibre composition is preferably at at least 61.5 wt % or at least 62.0 wt % or at least 62.5 wt % or at least 63.0 wt % or at least 63.5 wt % or at least 64.0 wt % or at least 64.5 wt % or at least 65.0 wt % or at least 65.7 wt % or at least 65.8 wt % or least 66.0 wt % or at least 66.2 wt % or at least 66.4 wt % or at least 66.6 wt % or at least 66.8 wt % or at least 67.0 wt % or at least 67.2 wt % or at least 67.4 wt %.

The CaO content of the inorganic fibre composition preferably varies accordingly, with the lower limit of CaO preferably at least 28.5 wt % or at least 29.0 wt % of at least 29.5 wt % or at least 30.0 wt %. The upper limit of the CaO content of the inorganic fibre composition is preferably no more than 38.5 wt % or no more than 38.0 wt % or no more than 37.5 wt % or no more than 37.0 wt % or no more than 36.5 wt % or no more than 36.0 wt % or no more than 35.5 wt % or no more than 35.0 wt % or no more than 34.5 wt % or no more than 34.0 wt % or no more than 33.5 wt % or no more than 33.0 wt % or no more than 32.5 wt % or no more than 32.0 wt %.

The MgO content of the inorganic fibre composition preferably comprises in the range of 0.13 wt % to 0.80 wt % MgO or 0.15 wt % to 0.70 wt % MgO or 0.17 wt % to 0.60 wt % MgO or 0.18 wt % to 0.50 wt % MgO or 0.19 wt % to 0.45 wt % MgO or 0.20 wt % to 0.45 wt % MgO.

In one embodiment, the other components comprise:
0.10 to 0.60 wt % $Al_2O_3$ or 0.20 to 0.55 wt % $Al_2O_3$ or 0.23 to 0.50 wt % $Al_2O_3$ or 0.24 to 0.45 wt % $Al_2O_3$ or 0.25 to 0.40 wt % $Al_2O_3$ or 0.25 to 0.35 wt % $Al_2O_3$; and/or
0 to 0.50 wt % alkali metal oxides or 0.01 to 0.40 wt % alkali metal oxides or 0.05 to 0.30 wt % or 0.06 to 0.25 wt % or 0.07 to 0.20 wt % or 0.08 to 0.18 wt % alkali metal oxides, or 0 to 0.25 wt % alkali metal oxides, or 0 to 0.20 wt % alkali metal oxides.

In some embodiments, at least 80 wt % of the alkali metal oxides comprise $Na_2O$ or $K_2O$.

In one embodiment, the range of other incidental impurities in the inorganic fibres is:
BaO: 0 to 0.05 wt % or >0 to 0.01 wt %
$B_2O_3$: 0 to 0.1 wt % or >0 to 0.05 wt %
$Cr_2O_3$: 0 to 0.08 wt % or >0 to 0.03 wt %
$Fe_2O_3$: 0 to 0.25 wt % or >0 to 0.15 wt %
$HfO_2$: 0 to 0.05 wt % or >0 to 0.01 wt %
$La_2O_3$: 0 to 0.1 wt % or >0 to 0.03 wt %
$Mn_3O_4$: 0 to 0.05 wt % or >0 to 0.01 wt %
$Li_2O$: 0 to 0.15 wt % or >0 to 0.08 wt %
$Na_2O$: 0 to 0.15 wt % or >0 to 0.08 wt %
$K_2O$: 0 to 0.5 wt % or >0 to 0.20 wt %
$P_2O_5$: 0 to 0.05 wt % or >0 to 0.01 wt %
SrO: 0 to 0.08 wt % or >0 to 0.03 wt %
$TiO_2$: 0 to 0.08 wt % or >0 to 0.03 wt %
$V_2O_5$: 0 to 0.05 wt % or >0 to 0.01 wt %
$SnO_2$: 0 to 0.05 wt % or >0 to 0.01 wt %
ZnO: 0 to 0.05 wt % or >0 to 0.01 wt %
$ZrO_2$: 0 to 0.1 wt % or >0 to 0.02 wt %

The sum of $BaO+Cr_2O_3+Fe_2O_3+HfO_2+La_2O_3+Mn_3O_4+Na_2O+K_2O+P_2O_5+SrO+TiO_2+V_2O_5+ZrO_2+ZnO$ is preferably less than 1.0 wt % or less than 0.8 wt % or less than 0.6 wt % or less than 0.5 wt % or less than 0.4 wt % or less than 0.3 wt % or less than 0.25 wt % or less than 0.2 wt % of the total weight of the inorganic fibres. The sum of $BaO+Cr_2O_3+Fe_2O_3+HfO_2+La_2O_3+Mn_3O_4+Na_2O+K_2O+P_2O_5+SrO+TiO_2+V_2O_5+ZrO_2+ZnO$ is typically at least 0.10 wt % or at least 0.20 wt % or at least 0.30 wt % of the total weight of the inorganic fibres.

In one embodiment, the inorganic fibres comprise:
66.0 to 69.0 wt % $SiO_2$ or (65.7 to 69.0 wt %) $SiO_2$;
30.0 to 34.0 wt % CaO or (30.0 to 34.2 wt %) CaO;
0.10 to 0.45 wt % (or 0.1 to 0.45 wt %; or 0.1 to 0.60 wt %) MgO
0 to 0.35 wt % (or 0.1 to 0.35 wt %; or 0 to 0.45 wt %; or 0 to 0.60 wt %) $Al_2O_3$
0 to 0.20 wt % (or 0.05 to 0.18 wt %) alkali metal oxides and
wherein the sum of $SiO_2$ and CaO is greater or equal to 99.0 wt %.

In some embodiments, the numerical average (or arithmetic mean) fibre diameter is less than 6.0 μm or less than 5.0 μm or less than 4.5 μm or less than 4.0 μm or less than 3.5 μm or less than 3.3 μm or less than 3.0 μm or less than 2.8 μm or less than 2.5 μm. Minimum numerical average fibre diameter is typically at least 1.5 μm or at least 2.0 μm to enable the fibres to have sufficient mechanical strength in use.

In some embodiments, the fibre has a dissolution rate, in the flow solubility test (pH 7.4), is preferably at least 150 $ng/cm^2hr$ or at least 170 $ng/cm^2hr$ or at least 200 $ng/cm^2hr$; or at least 250 $ng/cm^2hr$.

In some embodiments, the tensile strength of the fibre blanket (128 $kg/m^3$) is at least 50 kPa or at least 55 kPa or at least 60 kPa.

The thermal conductivity at 1000° C. of a 128 $kg/m^3$ fibre blanket is preferably less than 0.30 $W.m^{-1}.K^{-1}$ or less than 0.28 $W.m^{-1}.K^{-1}$ or less than 0.26 $W.m^{-1}.K^{-1}$ or less than 0.25 $W.m^{-1}.K^{-1}$.

In some embodiments, the resiliency of the fibre as made is at least 80%. The resiliency after 1100° C. for 24 hrs is preferably at least 70 wt % or at least 75 wt %. The resiliency after 1150° C. for 24 hrs is preferably at least 67 wt % or at least 70 wt %. The resiliency after 1200° C. for 24 hrs is preferably at least 63 wt % or at least 67 wt %.

By maintaining the other components (e.g. incidental impurities) within the above limits, the inorganic fibres of the present disclosure are able to maintain excellent high temperature utility.

While it may be possible for individual impurities levels to vary from their preferred range, through maintaining an overall low level of incidental impurities, the need for adding additives (e.g. viscosity modifier, solubility enhancer, refractory temperature stabiliser, etc.) to the calcia and silica mixture may be avoided or minimised.

Fiberisation techniques as taught in U.S. Pat. No. 4,238,213 or US2012/247156 may be used to form the disclosed fibres of the present invention. The apparatus and techniques disclosed in WO2017/121770 (which is incorporated herein in its entirety by reference) may be preferably used, particularly for compositions comprising higher silica contents (e.g. >68 wt % or >69 wt %).

An insulation system may comprise:
 a. the inorganic fibres according to any one of the preceding claims; and
 b. an $Al_2O_3$ rich refractory component,
wherein the inorganic fibres and refractory component are in contacting engagement.

The $Al_2O_3$ rich refractory component preferably comprises at least 50 wt % $Al_2O_3$ or at least 60 wt % or at least 70 wt % $Al_2O_3$. Examples of $Al_2O_3$ rich refractory components include mullite are clay-based components (e.g. refractory bricks).

A process for the formation of the inorganic fibres of the first aspect the present invention may comprise:
 combining a source of silica and calcia together;
 melting the silica and calcia to form a molten mass; and
 forming said inorganic fibres from the melt The source of silica is preferably silica sand. The source of calcia is preferably lime. The silica and calcia are each preferably derived from a single source. The quality of the silica and calcia raw materials are preferably monitored to ensure that incidental impurities are kept below 1.0 wt % or below 0.5 wt %. The lime is selected such that the resultant fibre composition comprises in the range of 0.10 to 0.85 wt % MgO.

Preferably the sum of MgO and incidental impurities are greater or equal to 0.3 wt % or greater or equal to 0.4 wt %. The amount of MgO and incidental impurities being sufficient to reduce the melt viscosity of the composition and enable fibres to be formed as described in previous aspects of the invention.

For the avoidance of doubt it should be noted that in the present specification the term "comprise" in relation to a composition is taken to have the meaning of include, contain, or embrace, and to permit other ingredients to be present. The terms "comprises" and "comprising" are to be understood in like manner. It should also be noted that no claim is made to any composition in which the sum of the components exceeds 100%.

Where a patent or other document is referred to herein, its content is incorporated herein by reference to the extent permissible under national law.

Further it should be understood that usage in compositions of the names of oxides [e.g. alumina, silica, potassia] does not imply that these materials are supplied as such, but refers to the composition of the final fibre expressing the relevant elements as oxides. The materials concerned may be provided in whole or in part as mixed oxides, compounded with fugitive components [e.g. supplied as carbonates] or indeed as non-oxide components [e.g. as halides].

Incidental impurities are defined as impurities which are derived from the raw material, fuel source or other sources during the formation of the inorganic fibres.

DETAILED DESCRIPTION OF A PREFERRED EMBODIMENT

Figure 1:
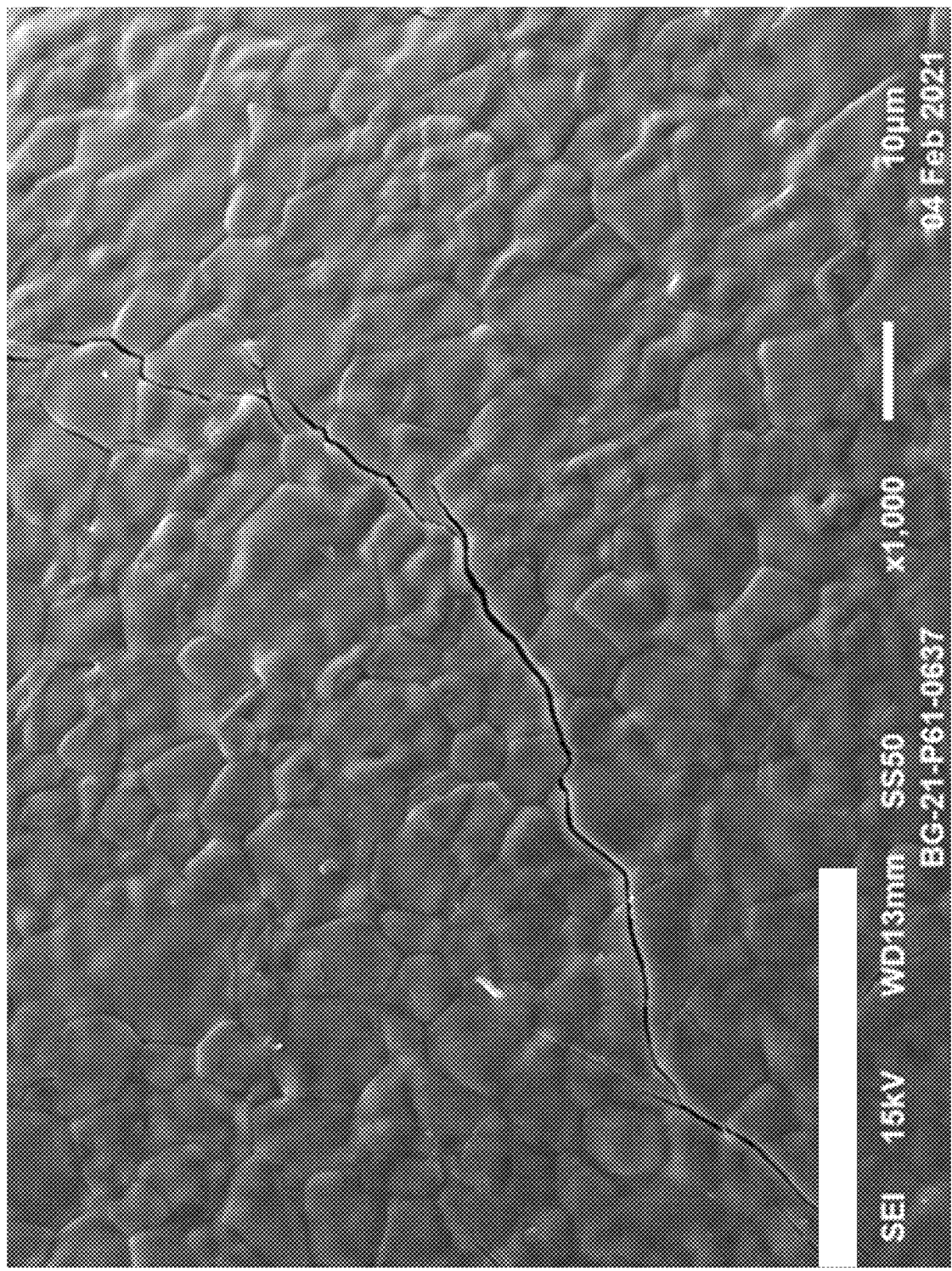
FIG. 1 is a SEM image of fibre sample C-24

Fibres according to the invention and comparative fibres described herein have been produced at either the French production facilities in Saint Marcellin, France by spinning [made from the melt by forming a molten stream and converting the stream into fibre by permitting the stream to contact one or more spinning wheels]; or at the applicant's research facilities in Bromborough, England by spinning or alternatively by blowing [fibres made from the melt by forming a molten stream and converting the stream into fibre by using an air blast directed at the stream]. The invention is not limited to any particular method of forming the fibres from a melt, and other methods [e.g. rotary or centrifugal formation of fibres; drawing; air jet attenuation] may be used. The resultant fibres were then fed onto a conveyor belt and entangled by needling methods, as known in the art.

The raw materials used to produce the inorganic fibres of a preferred embodiment of the present invention are lime and silica sand. The chemical analysis (normalised) of the lime used is provided in Table 1 below. The incidental impurities (100-CaO-$SiO_2$) in the lime is typically less than 2.0 wt %. The silica sand purity may be 98.5 wt % of 99.0 wt % or higher. Typically, the silica sand had a purity of greater than 99.5 wt % silica and less than 200 ppm $Fe_2O_3$; less than 1000 ppm $Al_2O_3$; less than 200 ppm $TiO_2$, less than 100 ppm CaO and less than 100 ppm $K_2O$.

TABLE 1

| Lime bag | CaO | $Al_2O_3$ | $Fe_2O_3$ | $K_2O$ | MgO | $SiO_2$ | $ZrO_2$ | Un-normalised XRF total |
|---|---|---|---|---|---|---|---|---|
| B1 | 97.97 | 0.28 | 0.21 | 0.04 | 0.41 | 1.09 | 0.01 | 98.39 |
| B2 | 98.12 | 0.30 | 0.21 | 0.04 | 0.38 | 0.93 | 0.00 | 99.17 |
| B3 | 97.79 | 0.30 | 0.21 | 0.04 | 0.37 | 1.26 | 0.02 | 99.39 |
| B4 | 97.56 | 0.35 | 0.21 | 0.04 | 0.38 | 1.43 | 0.01 | 99.00 |
| B5 | 97.64 | 0.54 | 0.21 | 0.04 | 0.38 | 1.15 | 0.01 | 99.94 |
| B6 | 97.61 | 0.49 | 0.22 | 0.04 | 0.41 | 1.15 | 0.04 | 99.92 |
| B7 | 97.97 | 0.33 | 0.20 | 0.04 | 0.40 | 1.01 | 0.01 | 98.93 |
| B8 | 95.15 | 0.34 | 0.20 | 0.04 | 0.40 | 3.85 | 0.00 | 99.94 |

The fibres/blankets made therefrom were then evaluated using the test methodology as described:

Test Methodology

The EN 1094-1-2008 standard was used for the shrinkage, tensile strength and resiliency tests.

Shot Content

Shot content was determined by a jet sieve method as detailed in WO2017/121770, incorporated herein by reference.

Thermal Stability (Shrinkage)

The method for determination of dimensional stability of refractory materials, including the refractory glass fibre insulation materials, is based on the EN ISO 10635. This method is a shrinkage test that measures the change of a flat specimen's linear dimensions after a heat treatment.

The shrinkage test requires a relatively rigid specimen's so that the linear dimensions could be accurately determined before and after the heat treatment. In cases where a needled fibre blanket specimen were not available, starch bonded vacuum formed boards were prepared from the glass fibre samples.

To prepare the vacuum formed boards, the as made fibre material were chopped using a small-scale industrial granulator through a #6 mesh (~3 mm opening). Chopped fibre samples were lightly cleaned using a sieve to remove any debris and large glass residues. 40 g of chopped clean fibre was mixed in 500 ml of 5 wt % concentration potato starch in water solution to create a slurry. Subsequently a vacuum former was used to produce 75×75 mm boards with a thickness of 10-15 mm. The vacuum former consists of a sealed acrylic mould with a 100 µm mesh bottom, a vacuum pump was used to remove the water from the slurry while manually compressing the shape using a flat plate. Vacuum formed boards were dried at 120° C.

To measure permanent linear shrinkage, the linear dimensions of specimen were measured to an accuracy of ±5 µm using a travelling microscope. The specimens were subsequently placed in a furnace and ramped to a temperature 50° C. below the test temperature (e.g. 1300° C.) at a rate of 300° C./hour and then ramped at 120° C./hour for the last 50° C. to test temperature and held for 24 hours. Specimens were allowed to cool down naturally to room temperature at the end of this heat treatment. After heat treatment, the specimen's linear dimensions were measured again using the same apparatus to calculate the change in dimensions. Shrinkage values are given as an average of 4 measurements.

Reactivity with Mullite

Needled fibre blanket specimens with approximate dimensions of 50 mm×100 mm were used for this test. Blanket specimens were placed on a fresh mullite Insulating Fire Brick (JM 28 IFB). The specimen, along with the IFB substrate, was heated treated at 1200° C. for 24 hours to confirm the reactivity after the heat treatment. The specimen and IFB were inspected for any sign of melting or reaction. The sample which did not react with the IFB at all were evaluated as good (○). The sample which reacted with the IFB (the sample was adhered to IFB or sign of melting was observed) were evaluated as poor (X).

Bio-Solubility

The biological solubility of fibrous materials can be estimated in a system in which the material is exposed to a simulated body fluid in a flow-through apparatus (i.e., in vitro). This measurement of solubility is defined as the rate of decrease of mass per unit surface area (Kdis). Although several attempts have been made to standardize this measurement, there is currently no international standard. Major protocol differences among laboratories include different simulated body fluid chemistries (and, most significantly, different buffering and organic components), flow rates, mass and/or surface area of samples, determination methods for specific surface area, and determination of mass loss. Consequently, Kdis values should be regarded as relative estimates of chemical reactivity with the simulated body fluid under the specific parameters of the test, not as measures of absolute solubility of fibrous particles in the human lung. The flow through solubility test method used in this study is a 3-week long solubility test in pH 7.4 saline. Two channels of each unique specimen are simultaneously tested. Samples of saline solution flowing over the fibre specimens are taken after 1, 4, 7, 11, 14, 19 and 21 days. The saline samples are analysed using the ICP method to measure the oxide dissolution levels in ppm level. To validate the flow test results and calculate the final dissolution rates for each specimen, the square root of remaining fibre mass against sampling times are plotted. Deviation from a linear trend could suggest an issue with the results. A good linear regression fit was observed in the flow test results conducted in this study. Based on the historical data collected by authors, a minimum of 150 ng/cm$^2$hr dissolution rate is required for a fibre to have exoneration potential. In the static solubility test method, fibre specimens are agitated in saline solution at 37° C. to replicate conditions within the lungs. The test monitors fibre dissolution after 5 or 24 hours using the ICP method.

Resiliency

The resiliency test (EN1094-1-2008) demonstrates the ability of fibre insulation products to spring back after being compressed to 50% of their initial thickness. Samples for resiliency testing in this document were in needled blanket form. As made or heat treated blanket specimens were cut to 100 mm×100 mm squares and dried at 110° C.±5° C. for 12 hours to remove any absorbed moisture.

Specimens were subsequently allowed to cool to room temperature and then test immediately. The initial thickness of blanket specimens were measured using the pin and disk method prior to resiliency testing. An Instron® universal mechanical test frame, equipped with 150 mm diameter flat compression platens was used for the resiliency tests. During the test, the specimens were compressed to 50% of their original thickness at a rate of 2 mm/min, the specimens were then held under compression for 5 minutes. Subsequently the specimens were allowed to spring back by lifting the compression platen until 725 Pa (for specimens 96 kg/m$^3$ bulk density) or 350 Pa (for specimens <96 kg/m$^3$ bulk density) was registered on the load cell and then held for a further 5 minutes. Following this test, the resiliency values were calculated using the formula below:

$$R = \frac{d_f}{d_0} \times 100$$

R=Resiliency
$d_f$=Thickness after testing
$d_0$=Initial Thickness

Tensile Strength The parting strength of a blanket is determined by causing rupture of test pieces at room temperature. Samples are cut using a template (230±5 mm×75±2 mm). The samples are dried at 110° C. to a constant mass, cooled to room temperature and then measured and tested immediately.

The width is measured using a steel rule to a 1 mm accuracy across the middle of the piece and the thickness of the sample is measured on each sample (at both ends of the sample) using the EN1094-1 needle method. A minimum of 4 samples for each test are taken along the direction of manufacture.

The samples are clamped at each end by clamps comprising a pair of jaws having at least 40 mm×75 mm in clamping area with serrated clamping surfaces to prevent slippage during the test. These dimensions give an unclamped span of 150±5 mm to be tested. The clamps are closed to 50% of the sample thickness (measured using a Vernier caliper or ruler).

The clamps are mounted in a tensile testing machine [e.g. Instron® 5582, 3365 using a 1 kN load cell, or a machine of at least the equivalent functionality for testing tensile strength]

The crosshead speed of the tensile testing machine is a constant 100 mm/min throughout the test.

Any measurement with the sample breaking nearer to the clamp jaw than to the centre of the sample is rejected.

The maximum load during the test is recorded to allow strength to be calculated.

Tensile strength is given by the formula:

$$R(m) = \frac{F}{W \times t}$$

Where:
R(m)=Tensile Strength (kPa)
F=Maximum Parting Force (N)
W=Initial Width of the active part of the test piece (mm)
T=Initial Thickness of test piece (mm)

The test result is expressed as the mean of these tensile strength measurements together with the bulk density of the product.

Fibre Diameter

Fibre diameter measurements were carried out using the Scanning Electron Microscope (SEM). SEM is a micro-analytical technique used to conduct high magnification observation of materials' microscopic details. SEM uses a tungsten filament to generate an electron beam, the electron beam is then rastered over a selected area of the specimen and the signal produced by the specimen is recorded by a detector and processed into an image display on a computer. A variety of detectors can be used to record the signal produced by the sample including secondary electrons and backscattered electrons detectors.

The particular SEM equipment used operates under vacuum and on electrically conductive specimens. Therefore, all glass/ceramic fibre specimens need to be coated with gold or carbon prior to SEM analysis. Coating was applied using an automated sputter coater at approximately 20 nm. In order to prepare the fibrous specimens for diameter measurements, fibre specimens were crushed using a pneumatic press at 400 psi. The aim of crushing is to ensure the sample is crushed enough to be dispersed without compromising the fibre length, crushing results in fibres with aspect ratios >3:1. The crushed fibre specimens is then cone and quartered to ensure representative sampling. Crushed and quartered fibres are dispersed in IPA. Typically, 50 μg of fibres are placed in a 50 mL centrifuge tube and 25 mL IPA is added. A SEM stub is then placed at centre of a petri dish, then the centrifuge tube is vigorously shaken and emptied into the petri dish containing the SEM stub. The petri dish is left in fume cupboard for 1 hour for the fibres to settle on the SEM stub. The SEM stub is then carefully coated with gold in preparation for SEM imaging.

Following this sample preparation step, an automated software on the SEM equipment is utilised to collect 350 unique secondary electron images at 1500× magnification from the SEM stub. Following the image collection step, the images are processed by the Scandium° system available from Olympus Soft Imaging Solutions GmbH, to measure the diameter of fibres. The process involves manual inspection of measured fibres in every image to ensure only the fibres particles with aspect ratios greater than 3:1 are measured. The final fibre diameter distribution is reposted in a graph as well as numerical average/arithmetic mean diameter.

Crystal Grain Size

Crystal grain size measurements on heat treated fibre materials were carried out using the Scanning Electron Microscope (SEM). SEM is a micro-analytical technique used to conduct high magnification observation of materials' microscopic details. SEM uses a tungsten filament to generate an electron beam, the electron beam is then rastered over a selected area of the specimen and the signal produced by the specimen is recorded by a detector and processed into an image display on a computer. A variety of detectors can be used to record the signal produced by the sample including secondary electrons and backscattered electrons detectors.

The particular SEM equipment used operates under vacuum and on electrically conductive specimens. Therefore, all glass/ceramic fibre specimens need to be coated with gold or carbon prior to SEM analysis. Coating was applied using a automated sputter coater at approximately 20 nm. In order to prepare the fibrous specimens for grain size measurements, fibre specimens were cone and quartered to ensure representative sampling. A SEM stub is prepared with a small representative sample of the specimen and carefully coated with gold in preparation for SEM imaging.

Following this sample preparation step, the SEM equipment is utilised to collect several unique secondary electron images at suitable magnification based on morphology (typically in 5000-10000× magnification range) from the SEM stub. Following the image collection step, the images are processed by a computer software program (Olympus Scandium®) to measure the grain size by drawing circles around the visible grain boundaries in several SEM images. The process involves manual inspection of fibres in every image to ensure only the fibres are in focus. The final grain size is reported as numerical average of all measurements (minimum of 10 measurements of representative crystals). Due to limitation in magnification and resolution of SEM images, the minimum measurable grain size was about 0.4 μm. Samples with lower crystal grain sizes were reported as having a mean grain size value <0.4 μm.

Melting Temperature

The melting temperature of the fibres was determined by DSC (10 k/min temperature increase from 30° C. to 1500° C.). Sample 26b (50 mg of fine powder ground from fibre) had a melting temperature of 1435.3° C.

Fibre Composition

Fibre composition was determined using standard XRF methodology. Results were normalised after analysis performed on $SiO_2$, CaO, $K_2O$, $Al_2O_3$, MgO and oxide components listed in Table 5. Un-normalised results were discarded if the total weight of the composition fell outside the range 98.0 wt % to 102.0 wt %.

Results

Referring to Table 2 & 3, there is shown the composition of inorganic fibres as % weight of the total composition according to Examples 1 to 26 and Comparative Examples C1 to C4.

TABLE 2

Examples with the prefix "C" are comparative examples

| Sample | SiO$_2$ | CaO | Al$_2$O$_3$ | K$_2$O | MgO | CaO + SiO$_2$ |
|---|---|---|---|---|---|---|
| C-1 | 72.8 | 24.9 | 1.1 | 0.6 | 0.6 | 97.7 |
| C-2 | 71.2 | 28.1 | 0.33 | 0.06 | 0.17 | 99.3 |
| 1 | 70.7 | 28.8 | 0.26 | 0.03 | 0.13 | 99.5 |
| 2 | 70.6 | 28.9 | 0.28 | 0.04 | 0.16 | 99.5 |
| 3 | 70.6 | 28.5 | 0.55 | 0.12 | 0.19 | 99.1 |
| 4 | 70.5 | 28.4 | 0.69 | 0.18 | 0.23 | 98.9 |
| 5 | 70.3 | 29.1 | 0.36 | 0.05 | 0.17 | 99.4 |
| 6 | 69.5 | 30.0 | 0.27 | 0.04 | 0.15 | 99.5 |
| 7 | 69.4 | 30.1 | 0.32 | 0.03 | 0.15 | 99.5 |
| 8 | 67.7 | 31.9 | 0.25 | 0.03 | 0.15 | 99.6 |
| 9 | 67.1 | 32.4 | 0.28 | 0.02 | 0.15 | 99.5 |
| 10 | 66.0 | 33.1 | 0.60 | 0.04 | 0.18 | 99.1 |
| 11 | 65.7 | 33.8 | 0.22 | 0.03 | 0.15 | 99.5 |
| 12 | 65.6 | 34.0 | 0.27 | 0.02 | 0.15 | 99.6 |
| 13 | 65.3 | 34.2 | 0.23 | 0.03 | 0.16 | 99.5 |
| 14 | 65.0 | 34.5 | 0.35 | 0.02 | 0.17 | 99.5 |
| 15 | 64.5 | 35.1 | 0.19 | 0.06 | 0.16 | 99.6 |
| 16 | 63.3 | 36.1 | 0.22 | 0.10 | 0.29 | 99.4 |
| 17 | 62.8 | 36.7 | 0.23 | 0.07 | 0.16 | 99.5 |
| 18 | 61.5 | 38.0 | 0.21 | 0.09 | 0.16 | 99.5 |
| 19 | 67.2 | 32.3 | 0.07 | 0.02 | 0.23 | 99.5 |
| 20 | 69.0 | 30.2 | 0.49 | 0.03 | 0.23 | 99.2 |
| 21 | 66.0 | 33.5 | 0.18 | 0.02 | 0.32 | 99.5 |
| 22 | 66.3 | 33.2 | 0.19 | 0.01 | 0.26 | 99.5 |
| C-23 | 66.3 | 33.2 | — | 0.004 | 0.03 | 99.5 |
| C-24 | 65.8 | 34.2 | 0.02 | 0.0 | 0.0 | 100.0 |
| 25 | 63.3 | 36.1 | 0.22 | 0.10 | 0.29 | 99.4 |
| 26 | 68.0 | 31.3 | 0.18 | 0.27 | 0.21 | 99.3 |
| 26b | 67.1 | 32.4 | 0.23 | 0.10 | 0.15 | 99.5 |
| C-3 | 60.7 | 38.9 | 0.26 | 0.07 | 0.17 | 99.6 |
| C-4 | 64.9 | 29.8 | 0.15 | 0.01 | 5.2 | 94.7 |
| C-5 | 60.7 | 38.8 | 0.23 | 0.12 | 0.17 | 99.5 |

As illustrated in Table 3, inorganic fibre compositions with silica levels less than 65.7 wt % were found to be not compatible with mullite based bricks, adhering to the bricks after being in contact at 1200° C. for 24 hrs. Inorganic fibre compositions with higher silica levels had generally higher shot content and higher fibre diameter.

TABLE 3

| Sample | Reactivity @ 1200° C. | Mullite 1300° C. (24 hrs) | Shrinkage at Shot content % wt | Mean Fibre diameter (μm) |
|---|---|---|---|---|
| C-1 | O | 2.0 | — | 6.9 |
| C-2 | O | 1.4 | 59.3 | — |
| 1 | — | 0.9 | 51.9 | 5.7 |
| 2 | O | 1.4 | 52.0 | — |
| 3 | O | 2.2 | 54.5 | — |
| 4 | O | 2.7 | 53.4 | 2.67 |
| 5 | O | 1.1 | 50.6 | — |
| 6 | O | — | 49.5 | — |
| 7 | O | 1.2 | 47.8 | — |
| 8 | O | 2.0 | 34.6 | — |
| 9 | O | 1.4 | 47.3 | — |
| 10 | O | 1.2 | 36.6 | 3.02 |
| 11 | O | 0.8 | 37.7 | — |
| 12 | X | 1.3 | 37.4 | 3.33 |
| 13 | X | 2.0 | 39.7 | — |
| 14 | X | — | 38.2 | 2.87 |
| 15 | — | 2.2 | — | — |
| 16 | — | 1.7 | — | — |
| 17 | — | 2.6 | — | — |
| 18 | — | 3.3 | — | — |
| 19 | — | 2.1 | — | — |
| 20 | — | 1.7 | — | — |
| 21 | — | 1.6 | — | 2.65 |
| 22 | — | 1.1 | — | 2.37 |
| 25 | — | 1.7 | — | — |
| 26 | — | 2.0 | — | — |
| C-3 | — | 8.6 | — | — |
| C-4 | X | 14.5 | — | — |
| C-5 | — | 5.6 | — | — |

Effects of Impurities

To assess the effects of the incidental impurities in the raw materials, an ultra pure sample (24) was produced using a silica (SiO2: 99.951 wt %, Al$_2$O$_3$: 0.038wt % Fe$_2$O$_3$: 0.012 wt %) and calcia (CaO: 99.935 wt %, SiO$_2$: 0.011 wt %, Al$_2$O$_3$: 0.012wt % Fe$_2$O$_3$: 0.011 wt %, SrO: 0.031 wt %). The remaining components were less than the XRF detection limit (<0.01 wt %).

To assess the effect of impurities, additional amounts of Al$_2$O$_3$, MgO and ZrO$_2$ were added to the existing incidental impurities. With reference to Table 4a, increasing amounts of MgO and Al$_2$O$_3$ results in reduced thermal stability at 1300° C. (24 hrs), as measured by the % shrinkage. Example C-34 is a repetition of sample E-174 from U.S. Pat. No. 5,332,699.

Shrinkage @1300° C. for 24 hours

The lowest shrinkage (best high temperature performance) was observed in samples 32 & 33. Sample 33 was a control sample with no additives, whereas Sample F has a slightly elevated MgO level, although in both samples, the sum of SiO$_2$ and CaO is greater than 99.0 wt %. Sample 32 appears to be an anomaly in the correlation between shrinkage and MgO content of Samples C-30 to 33. Likewise, Example 37 is also considered a suspect result, with the shrinkage result expected to be below 4%. The results indicate that, in general, a higher CaO+SiO$_2$ level corresponds to fibre compositions with improved high temperature stability as measured by the shrinkage test.

TABLE 4A

Examples with the prefix "C" are comparative examples

| # | SiO$_2$ | CaO | Al$_2$O$_3$ | K$_2$O | MgO | ZrO$_2$ | CaO + SiO$_2$ | Static Solubility (pH 7.4) ppm | Shrinkage at 1300° C. |
|---|---|---|---|---|---|---|---|---|---|
| C-27 | 59.9 | 35.2 | 0.34 | 0.10 | 4.31 | 0.00 | 95.1 | 380 | 24.1 |
| C-28 | 62.4 | 35.4 | 0.24 | 0.13 | 1.66 | 0.00 | 97.8 | 265 | 6.1 |
| C-29 | 62.6 | 35.7 | 0.23 | 0.06 | 1.35 | 0.00 | 98.3 | 375 | 11.3 |
| C-30 | 65.7 | 33.1 | 0.19 | 0.09 | 0.97 | 0.00 | 98.8 | 294 | 7.0 |
| 31 | 65.4 | 33.4 | 0.20 | 0.08 | 0.82 | 0.00 | 98.8 | 270 | 3.4 |
| 32 | 66.1 | 33.0 | 0.19 | 0.10 | 0.56 | 0.00 | 99.1 | 289 | 1.7 |

TABLE 4A-continued

Examples with the prefix "C" are comparative examples

| # | SiO$_2$ | CaO | Al$_2$O$_3$ | K$_2$O | MgO | ZrO$_2$ | CaO + SiO$_2$ | Static Solubility (pH 7.4) ppm | Shrinkage at 1300° C. |
|---|---|---|---|---|---|---|---|---|---|
| 33 | 66.1 | 33.4 | 0.18 | 0.05 | 0.25 | 0.00 | 99.5 | 548 | 2.6 |
| C-34 | 63.4 | 34.9 | 0.84 | 0.08 | 0.47 | 0.32 | 98.3 | 301 | 5.7 |
| C-35 | 65.5 | 32.6 | 1.48 | 0.13 | 0.21 | 0.00 | 98.1 | 167 | 6.6 |
| C-36 | 65.5 | 33.1 | 1.04 | 0.18 | 0.20 | 0.00 | 98.6 | 208 | 4.1 |
| 37 | 65.5 | 33.6 | 0.56 | 0.14 | 0.26 | 0.00 | 99.1 | 249 | 5.0 |

Surface Crystal Size

Figure 2:
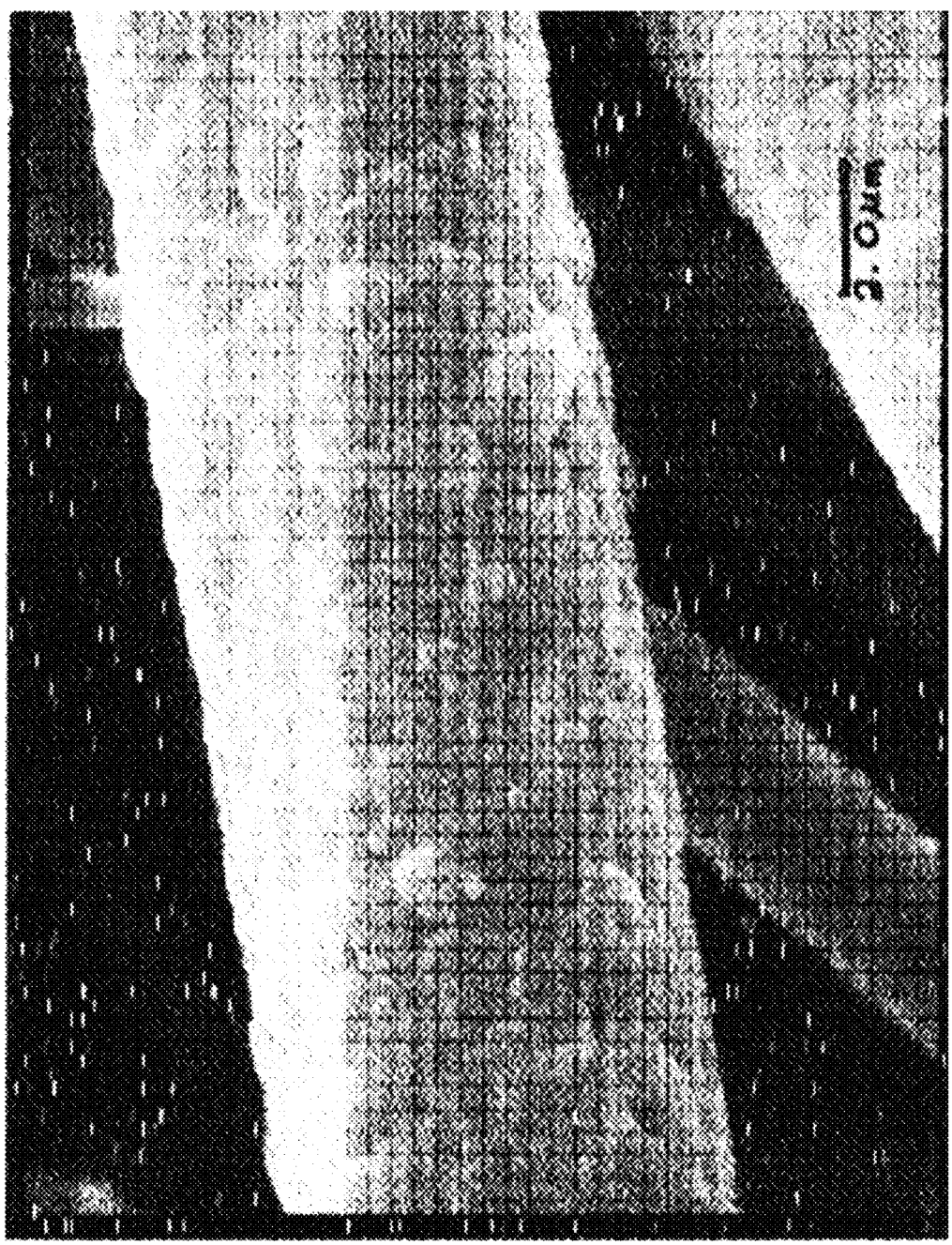
FIG. 2 is a SEM image of a fibre produced accordingly to the prior art (sample C-23)

The ultra-pure raw materials were difficult to form fibres and when fibres were formed, yield was low and fibre diameter was large (e.g. >500 μm). As illustrated in FIG. 1, The surface of the fibres contain a mean crystal grain size approaching 5 μm, with cracking also observed. The prevalence of surface crystals was also noted on the high purity sample of the prior art (FIG. 2), with a mean crystal grain size of about 1 μm.

As indicated in Table 4a, higher totals of CaO+SiO$_2$ tend to correspond to higher high temperature performance and bio-solubility. Table 4b further discloses the correlation between high temperature performance and the MgO content.

TABLE 4B

| # | SiO$_2$ | CaO | Al$_2$O$_3$ | K$_2$O | MgO | ZrO$_2$ | CaO + SiO$_2$ | Shrinkage at 1300° C. |
|---|---|---|---|---|---|---|---|---|
| 38 | 65.36 | 33.72 | 0.17 | 0.02 | 0.76 | 0.00 | 99.09 | 3.8 |
| 39 | 65.20 | 34.05 | 0.16 | 0.01 | 0.58 | 0.00 | 99.25 | 2.7 |
| 40 | 65.23 | 34.12 | 0.15 | 0.01 | 0.51 | 0.00 | 99.35 | 2.2 |
| 41 | 65.50 | 33.65 | 0.16 | 0.01 | 0.66 | 0.00 | 99.15 | 3.2 |
| 42 | 65.44 | 33.77 | 0.14 | 0.01 | 0.58 | 0.01 | 99.21 | 2.9 |
| 43 | 65.43 | 33.88 | 0.14 | 0.01 | 0.52 | 0.01 | 99.31 | 2.2 |
| 44 | 65.46 | 33.87 | 0.15 | 0.01 | 0.47 | 0.01 | 99.33 | 3.1 |
| 45 | 65.56 | 33.75 | 0.24 | 0.02 | 0.41 | 0.02 | 99.31 | 2.2 |
| 46 | 65.51 | 33.90 | 0.14 | 0.01 | 0.37 | 0.01 | 99.41 | 2.1 |
| 47 | 65.72 | 33.68 | 0.18 | 0.01 | 0.36 | 0.01 | 99.40 | 1.8 |
| 48 | 65.87 | 33.59 | 0.17 | 0.02 | 0.32 | 0.01 | 99.45 | 1.8 |
| 49 | 65.93 | 33.48 | 0.15 | 0.01 | 0.39 | 0.01 | 99.41 | 1.9 |
| 50 | 65.98 | 33.46 | 0.18 | 0.02 | 0.32 | 0.01 | 99.43 | 1.6 |
| 51 | 66.16 | 33.36 | 0.15 | 0.01 | 0.29 | 0.01 | 99.52 | 1.4 |
| 52 | 66.33 | 33.25 | 0.14 | 0.01 | 0.27 | 0.01 | 99.58 | 1.2 |
| 53 | 66.25 | 33.30 | 0.15 | 0.01 | 0.26 | 0.01 | 99.55 | 1.4 |
| 54 | 65.56 | 33.84 | 0.14 | 0.01 | 0.41 | 0.01 | 99.40 | 1.3 |
| 55 | 66.26 | 33.22 | 0.19 | 0.01 | 0.26 | 0.01 | 99.48 | 1.1 |

Figure 3:
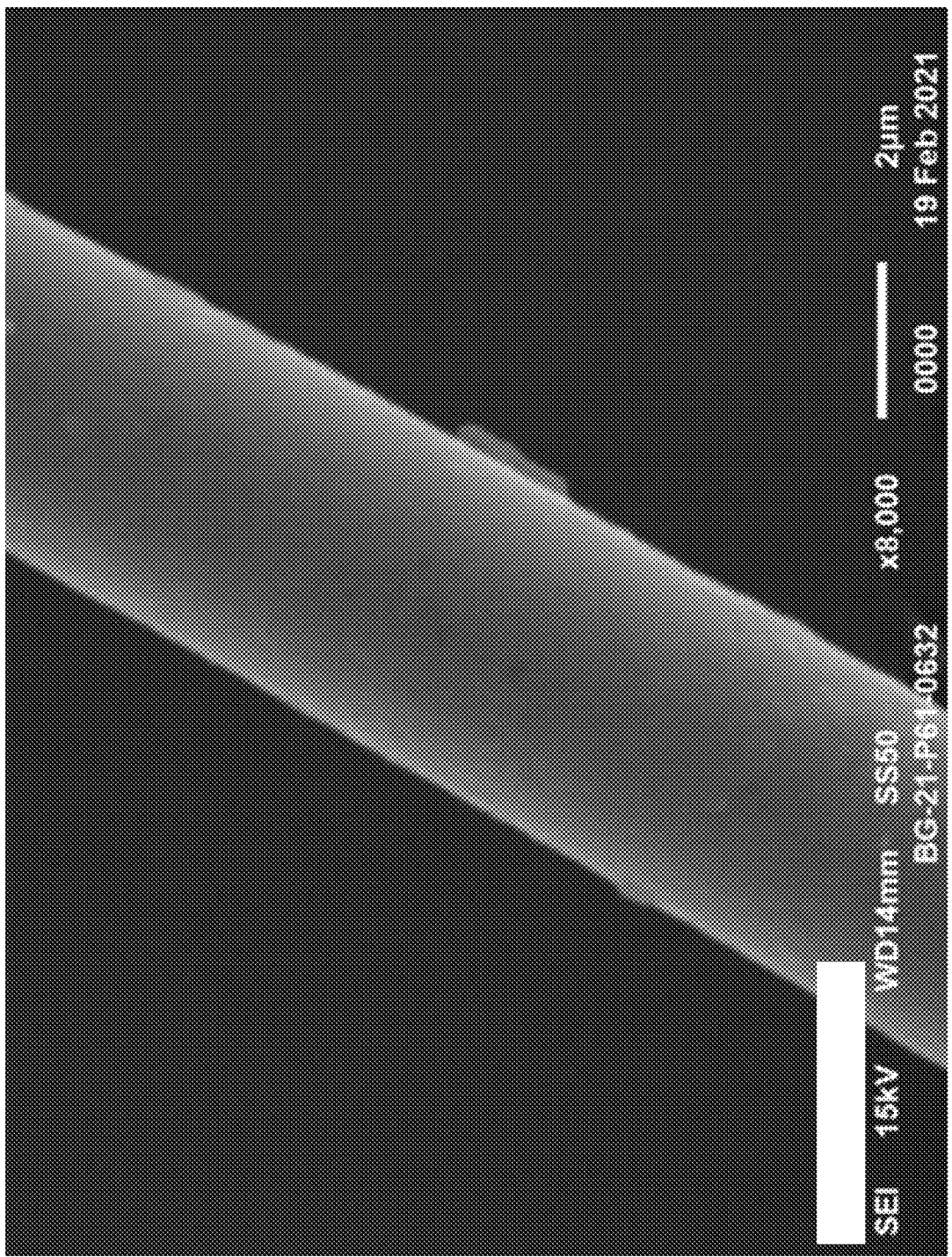
FIG. 3 is a SEM image of a fibre sample 19
Figure 4:
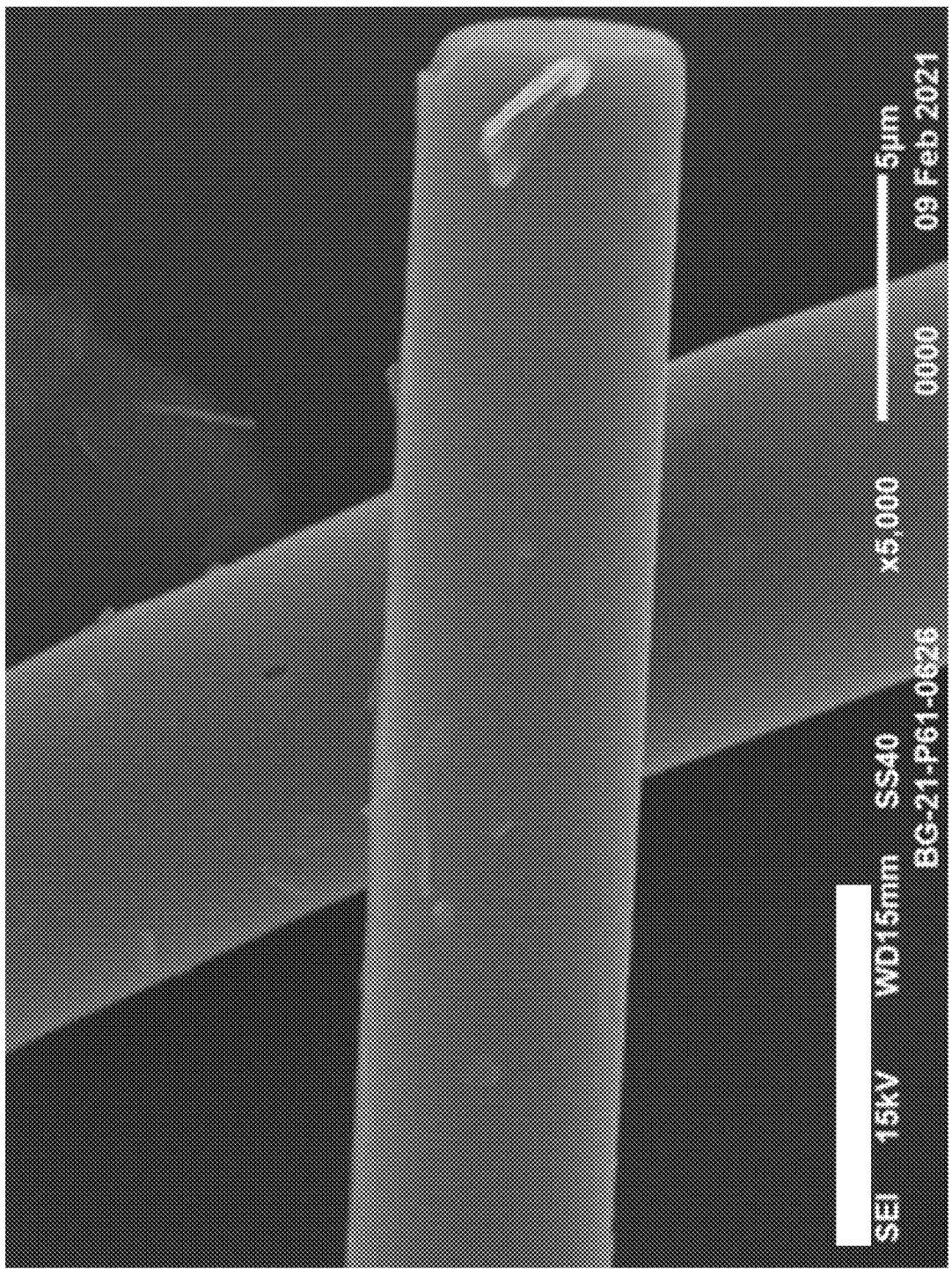
FIG. 4 is a SEM image of a fibre sample 31
Figure 5:
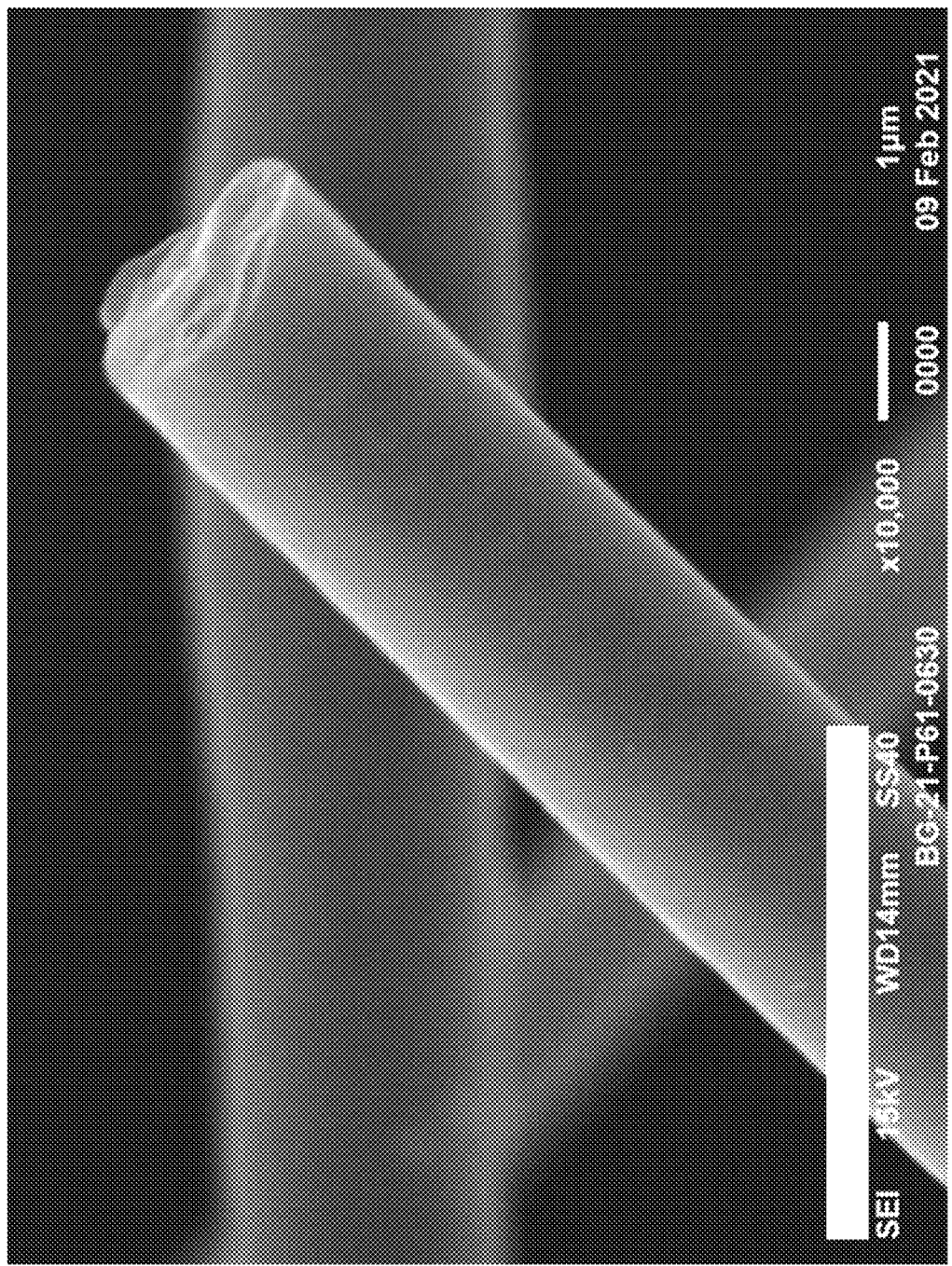
FIG. 5 is a SEM image of a fibre sample 22
Figure 6:
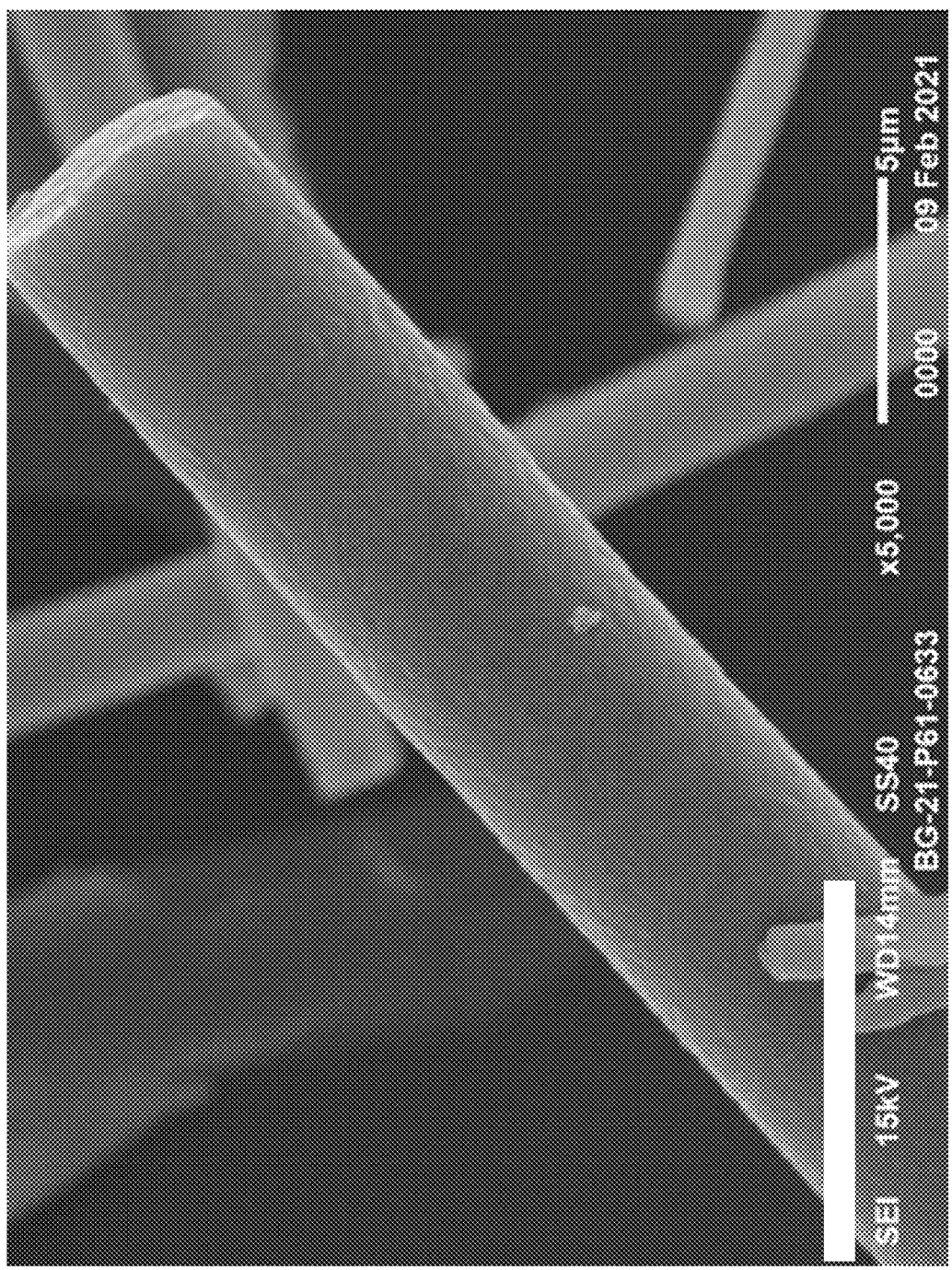
FIG. 6 is a SEM image of a fibre sample 20
Figure 7:
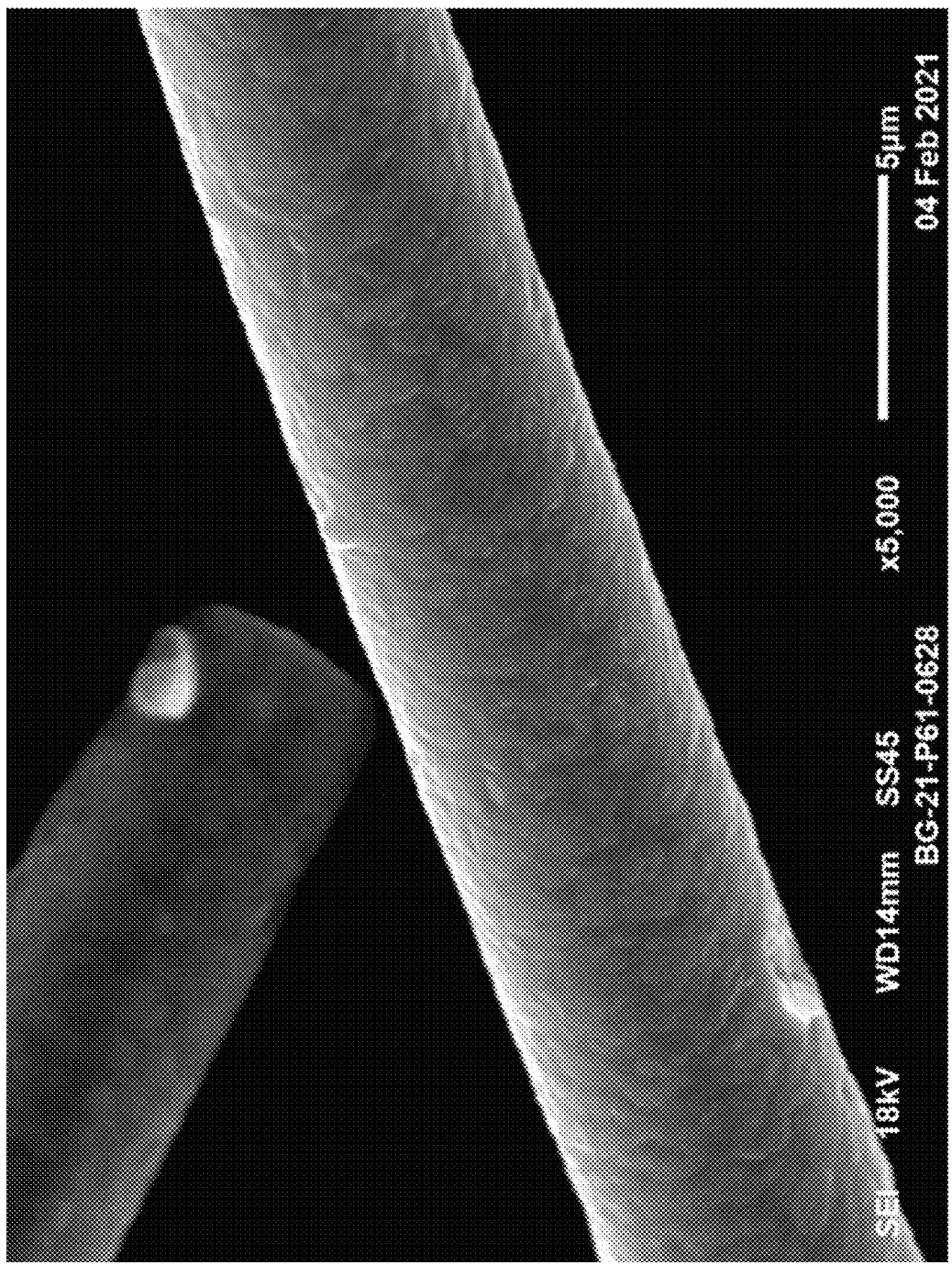
FIG. 7 is a SEM image of a fibre sample C-36
Figure 8:
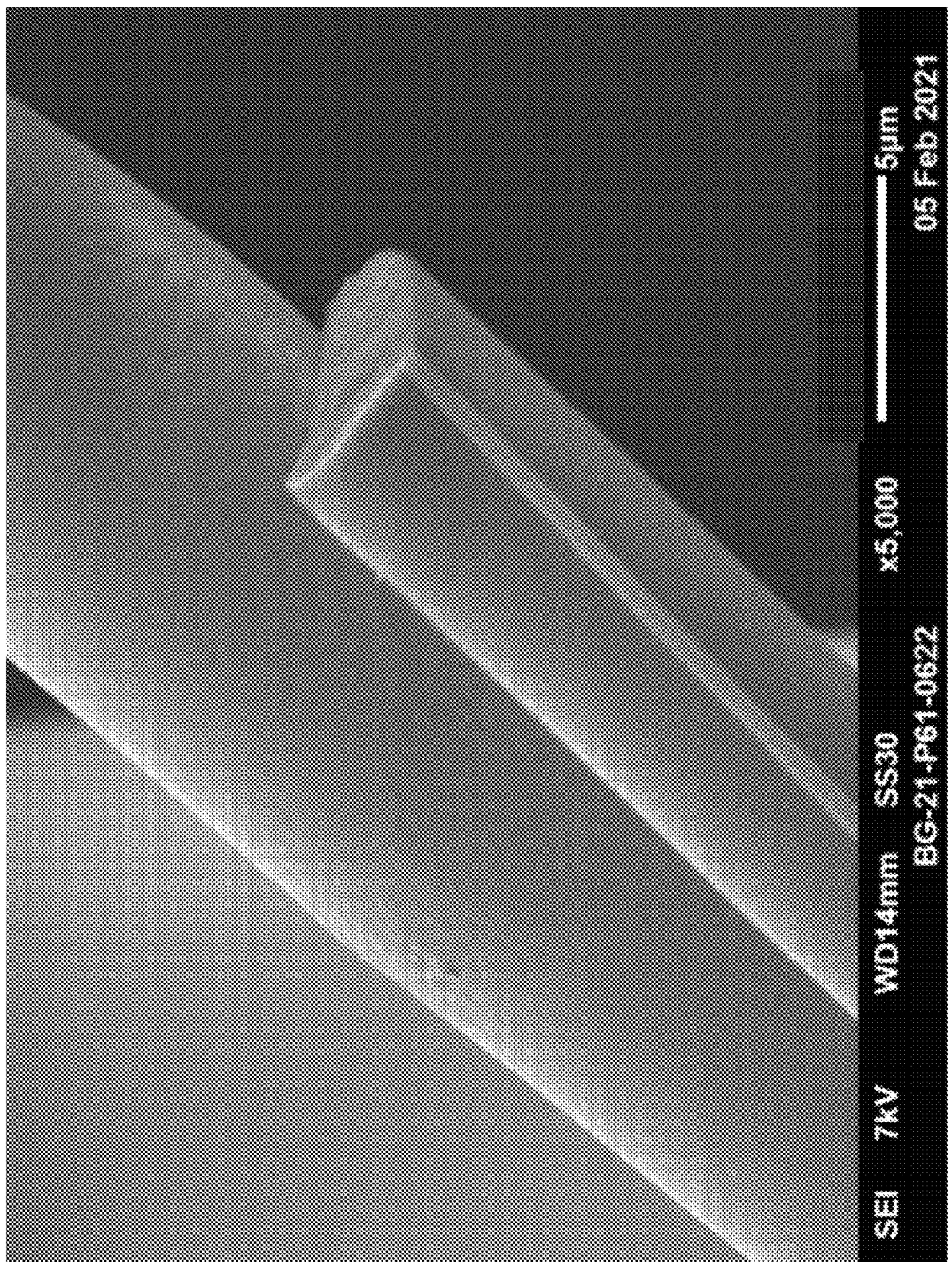
FIG. 8 is a SEM image of sample 8
Figure 9:
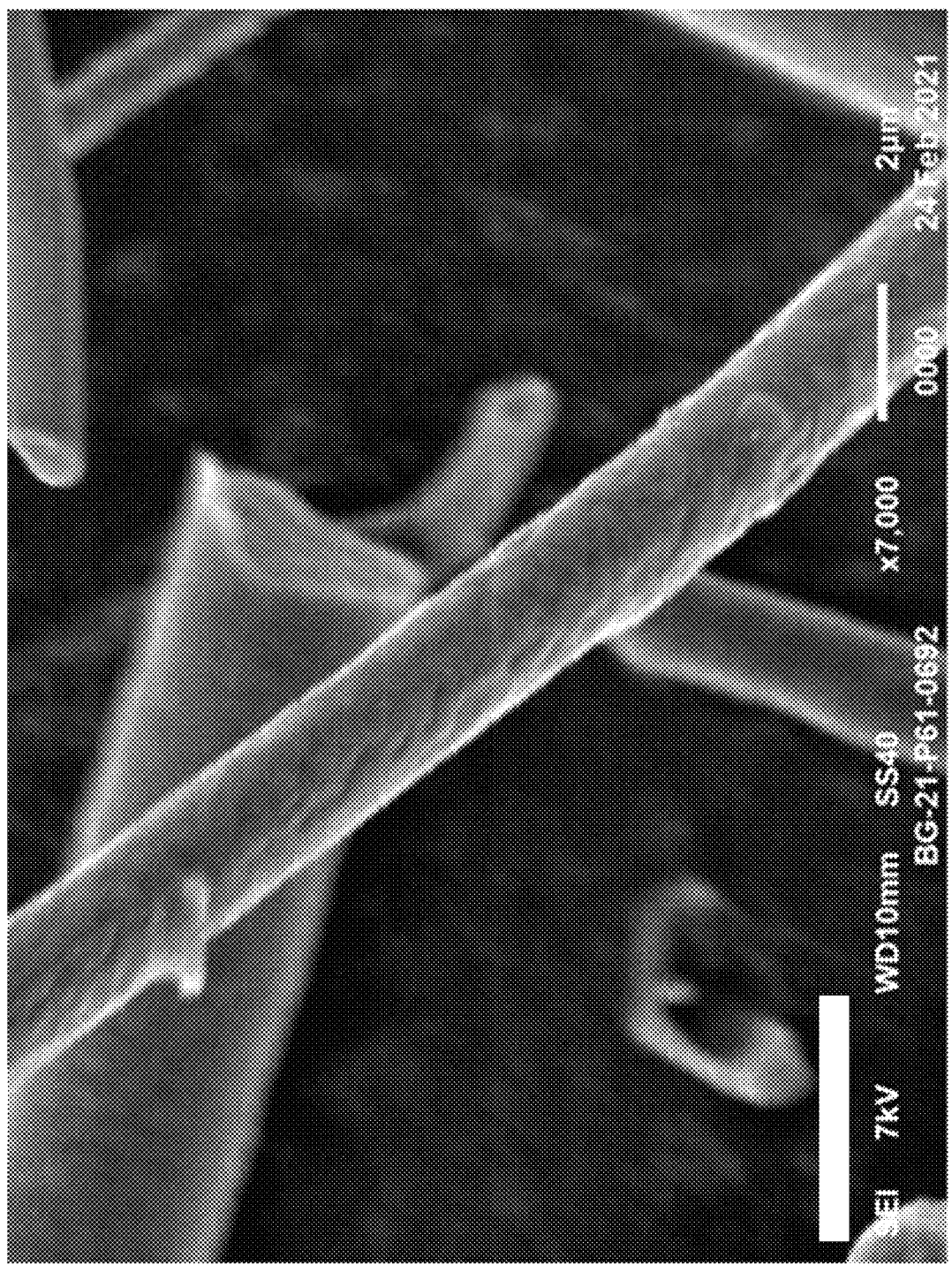
FIG. 9 is a SEM image of sample 26

The effect of the additional of MgO is illustrated in FIGS. 3 & 4, with sample 19 (FIG. 3) and sample E (FIG. 4) representing a composition with MgO being the predominant minor oxide component. The results indicate that MgO levels of up to at least 1 wt % are able to suppress crystal grow at 1100° C. The effect of the additional of increased levels of Al$_2$O$_3$ are illustrated in FIGS. 5, 6 & 7, with a mean crystal size of almost 1 μm obtained with an Al$_2$O$_3$ content of 1.04 wt %, with CaO+SiO$_2$ wt % of 98.6 wt %. The effect of K$_2$O content is illustrated in FIGS. 8 (sample 8) and 9 (sample 26), with the increase in K$_2$O content from 0.03 wt % (sample 8) to 0.27 wt % (sample C-26) corresponding to an increase in crystal size from below the detection limit (<0.4 μm) to 0.54 μm.

The results confirm that either too little or too much minor components within the composition may lead to elevated crystal size, which is related to a deterioration in high temperature mechanical performance. In particular, MgO has been shown to supress crystal growth, whilst Al$_2$O$_3$ has been demonstrated to promote crystal growth, particularly at elevated levels (e.g. greater than 0.80 wt % Al$_2$O$_3$). Apart from the main incidental impurities of Al$_2$O$_3$, MgO and K$_2$O, the XRF analysis measured the metal oxides listed in Table 6. The maximum and minimum incidental impurity level of each of the metal oxides is provided. Typically, these minor incidental impurities are less than 0.3 wt % or less than 0.25 wt % or less than 0.20 wt %; and typically at least 0.10 wt %.

TABLE 5

| Example | Shrinkage at 1300° C. (24 hrs) | Grain size (pm) @ 1100° C. (24 hrs) | % wt of largest minor component |
|---|---|---|---|
| 4 | 2.7 | 0.47 | 0.69 Al$_2$O$_3$ |
| 7 | 1.2 | <0.4 | 0.32 Al$_2$O$_3$ |
| 8 | 0.8 | <0.4 | 0.25 Al$_2$O$_3$ |
| 11 | 1.4 | <0.4 | 0.22 Al$_2$O$_3$ |
| 19 | 2.1 | <0.4 | 0.23 MgO |
| 20 | 1.7 | 0.48 | 0.49 Al$_2$O$_3$ |
| 21 | 1.6 | <0.4 | 0.32 Al$_2$O$_3$ |
| 22 | 1.1 | <0.4 | 0.26 Al$_2$O$_3$ |
| C-23 | — | 0.94 | 0.03 MgO |
| C-24 | — | 4.93 | 0.02 Al$_2$O$_3$ |
| 25 | 1.7 | 0.48 | 0.29 MgO |

TABLE 5-continued

| Example | Shrinkage at 1300° C. (24 hrs) | Grain size (pm) @ 1100° C. (24 hrs) | % wt of largest minor component |
|---|---|---|---|
| 26 | 2.0 | 0.54 | 0.27 $K_2O$ |
| C-27 | 24.1 | — | 4.31 MgO |
| C-28 | 6.1 | — | 1.66 MgO |
| C-29 | 11.3 | — | 1.35 MgO |
| C-30 | 7.0 | <0.4 | 0.97 MgO |
| 31 | 3.4 | <0.4 | 0.82 MgO |
| 32 | 1.7 | <0.4 | 0.56 MgO |
| 33 | 2.6 | — | 0.2 MgO |
| C-34 | 5.7 | 0.94 | 0.84 $Al_2O_3$ |
| C-35 | 6.6 | — | 1.48 $Al_2O_3$ |
| C-36 | 4.1 | 0.90 | 1.04 $Al_2O_3$ |
| 37 | 5.0 | <0.4 | 0.56 $Al_2O_3$ |

TABLE 6

| Incidental impurities | Max level (% wt) | Min level (% wt) |
|---|---|---|
| BaO | 0.01 | 0.00 |
| $Cr_2O_3$ | 0.02 | 0.00 |
| $Fe_2O_3$ | 0.13 | 0.08 |
| $HfO_2$ | 0.00 | 0.00 |
| $La_2O_3$ | 0.07 | 0.00 |
| $Mn_3O_4$ | 0.00 | 0.00 |
| $Na_2O$ | 0.03 | 0.00 |
| $P_2O_5$ | 0.00 | 0.00 |
| SrO | 0.03 | 0.00 |
| $TiO_2$ | 0.03 | 0.00 |
| $V_2O_5$ | 0.01 | 0.00 |
| $SnO_2$ | 0.01 | 0.00 |
| ZnO | 0.00 | 0.00 |
| $ZrO_2$ | 0.02 | 0.00 |

Thermal Conductivity of Bodies of Inorganic Fibres

Thermal conductivity of a body of melt formed fibres (e.g. a blanket or other product form) is determined by a number of factors including in particular:
- Diameter of the fibres; and
- "Shot" (unfiberised material) content Fine diameter fibres provide low thermal conductivity to a body of fibres by reducing the scope for conduction through the solid and permitting finer inter-fibre porosity increasing the number of radiate-absorb steps for heat to pass by radiation from one side of the body to the other.

The presence of shot in a blanket increases thermal conductivity of the blanket by increasing the scope for conduction through the solid. Shot also increases the density of a blanket. The lower the shot content, the lower the thermal conductivity and density. For two bodies of identical fibre content and chemistry, the body with the lower shot content will have both the lower density and lower thermal conductivity.

In reference to Table 7, inorganic fibres were produced with a fibre diameter between approximately 2.6 to 3.0 μm and a shot content between 33 and 41 wt %. From the dataset provided in Tables 7 & 8, there is no clear correlation between fibre characteristics and thermal conductivity, although a larger data set should provide this expected relationship.

TABLE 7

| SAMPLE | Shot (>45 μm) % wt | SEM Fibre diameter (μm) |
|---|---|---|
| 10 | 36.6 | 3.02 |
| 12 | 32.5 | 2.65 |
| 13 | 40.6 | — |
| 14 | 38.3 | 2.70 |
| 15 | 38.7 | 2.76 |
| P61-0488 | 32.1 | 3.01 |

TABLE 8

| | Conductivity (W/m · K) | | | | | | Density | Strength | Density |
|---|---|---|---|---|---|---|---|---|---|
| SAMPLE | 400° C. | 600° C. | 800° C. | 1000° C. | 1100° C. | 1200° C. | Kg/m³ | kPa | Kg/m³ |
| 10 | 0.08 | 0.13 | 0.22 | 0.33 | 0.40 | 0.47 | 88 | 35 | 91 |
| 12 | 0.07 | 0.12 | 0.21 | 0.32 | 0.39 | 0.46 | 96 | 50 | 95 |
| 13 | 0.08 | 0.13 | 0.20 | 0.28 | 0.33 | 0.39 | 111 | 50 | 121 |
| 14 | 0.07 | 0.11 | 0.18 | 0.27 | 0.33 | 0.39 | 105 | 48 | 115 |
| 15 | 0.07 | 0.12 | 0.19 | 0.29 | 0.35 | 0.41 | 105 | 56 | 123 |
| P61-0488 | 0.07 | 0.11 | 0.17 | 0.24 | 0.28 | 0.32 | 128 | 60 | 132 |

Bio-solubility

Referring now to Table 9, there is shown data for bio-solubility testing.

A 21 day static and long flow through solubility test in saline pH 7.4 was conducted on the compositions shown in Table 9. Two samples of each fibre composition were simultaneously tested, with the average results reported. The saline samples were analysed using the ICP method to measure the oxide dissolution levels in ppm level. The results confirm that the fibres have low biopersistence. A low biopersistence fibre composition is taken to be a fibre composition which has a dissolution rate, in the flow solubility test, of at least 150 ng/cm²hr or at least 170 ng/cm²hr or at least 200 ng/cm²hr.

The inorganic fibres under the present invention have comparable or improved bio-solubility in comparison with prior art fibre compositions C1 and C2. As indicated by the specific surface area measurements, fine fibre dimensions promote increased bio-solubility.

Summary of Results

The above results highlight that the fibre composition of the present disclosure is able to produce a refractory fibre with great utility without the need for the deliberate additional of significant amounts of additives to enhance one or more fibre properties. This unexpected result also enables refractory fibres to be produced with a lower carbon footprint due to the reduced number of raw materials required for its production.

TABLE 9

| Sample Description | Static Solubility (pH 7.4 saline) (total ppm) | Flow through Dissolution Rate (pH 7.4 saline) (ng/cm$^2$hr) | Specific Surface Area (m$^2$/g) |
|---|---|---|---|
| C-1 | 230 | 125 | 0.1652 |
| C-2 | 313 | 379 | 0.2526 |
| 11 | 378 | 348 | 0.2887 |
| 16 | 295 | 326 | 0.3375 |
| 17 | 370 | — | — |
| 18 | 208 | — | — |
| 19 | 333 | — | — |
| 20 | 292 | — | — |
| 26 | 473 | — | — |

Potential Uses

The fibres of the present invention can be used, subject to meeting relevant performance criteria, for any purpose for which fibrous inorganic materials, and particularly alkaline earth silicate and aluminosilicate materials, have been used heretofore; and may be used in future applications where the fibre properties are appropriate. In the following reference is made to a number of patent documents relating to applications in which the fibres may be used, subject to meeting relevant performance criteria for the application. The fibres of the present invention can be used in place of the fibres specified in any of these applications subject to meeting relevant performance criteria.

For example, the fibres may be used as:
bulk materials;
deshotted materials [WO2013/094113];
in a mastic or mouldable composition [WO2013/080455, WO2013/080456] or as part of a wet article [WO2012/132271];
as a constituent in needled or otherwise entangled [WO2010/077360, WO2011/084487] assemblies of materials, for example in the form of blanket, folded blanket modules, or high density fibre blocks [WO2013/046052];
as a constituent of non-needled assemblies of materials, for example felts, vacuum formed shapes [WO2012/132469], or papers [WO2008/136875, WO2011/040968, WO2012/132329, WO2012/132327];
as a constituent (with fillers and/or binders) of boards, blocks, and more complex shapes [WO2007/143067, WO2012/049858, WO2011/083695, WO2011/083696];
as strengthening constituents in composite materials such as, for example, fibre reinforced cements, fibre reinforced plastics, and as a component of metal matrix composites;
in support structures for catalyst bodies in pollution control devices such as automotive exhaust system catalytic converters and diesel particulate filters [WO2013/015083], including support structures comprising:
  edge protectants [WO2010/024920, WO2012/021270];
  microporous materials [WO2009/032147, WO2011019394, WO2011/019396];
  organic binders and antioxidants [WO2009/032191];
  intumescent material [WO2009/032191];
  nanofibrillated fibres [WO2012/021817];
  microspheres [WO2011/084558];
  colloidal materials [WO2006/004974, WO2011/037617]
  oriented fibre layers [WO2011/084475];
  portions having different basis weight [WO2011/019377];
  layers comprising different fibres [WO2012065052];
  coated fibres [WO2010122337];
  mats cut at specified angles [WO2011067598];
  [NB all of the above features may be used in applications other than support structures for catalytic bodies]
as a constituent of catalyst bodies [WO2010/074711];
as a constituent of friction materials [e.g. for automotive brakes [JP56-16578]];
for fire protection [WO2011/060421, WO2011/060259, WO2012/068427, WO2012/148468, WO2012/148469, WO2013074968];
as insulation, for example;
  as insulation for ethylene crackers [WO2009/126593], hydrogen reforming apparatus [U.S. Pat. No. 4,690,690];
  as insulation in furnaces for the heat treatment of metals including iron and steel [U.S. Pat. No. 4,504,957];
  as insulation in apparatus for ceramics manufacturing.

The fibres may also be used in combination with other materials. For example the fibres may be used in combination with polycrystalline (sol-gel) fibres [WO2012/065052] or with other biosoluble fibres [WO2011/037634].

Bodies comprising the fibres may also be used in combination with bodies formed of other materials. For example, in insulation applications, a layer of material according to the present invention [for example a blanket or board] may be secured to a layer of insulation having a lower maximum continuous use temperature [for example a blanket or board of alkaline earth silicate fibres] [WO2010/120380, WO2011133778]. Securing of the layers together may be by any known mechanism, for example blanket anchors secured within the blankets [U.S. Pat. No. 4,578,918], or ceramic screws passing through the blankets [see for example DE3427918-A1].

Treatment of the Fibres

In formation of the fibres or afterwards they may be treated by applying materials to the fibres.

For example:
lubricants may be applied to the fibres to assist needling or other processing of the fibres;
coatings may be applied to the fibres to act as binders;
coatings may be applied to the fibres to provide a strengthening or other effect, for example phosphates [WO2007/005836] metal oxides [WO2011159914] and colloidal materials such as alumina, silica and zirconia [WO2006/004974];

binders may be applied to the fibres to bind the fibres subsequent to incorporation in a body comprising such fibres.

Many variants, product forms, uses, and applications of the fibres of the present invention will be apparent to the person skilled in the art and are intended to be encompassed by this invention.

By providing biosoluble fibres having maximum continuous use temperature higher than alkaline earth silicate fibres, the present invention extends the range of applications for which biosoluble fibres may be used. This reduces the present need, for many applications, to use fibres that are not biosoluble.

The invention claimed is:

1. Inorganic fibres having a composition comprising:
   61.0 to 70.8 wt % $SiO_2$;
   28.0 to 39.0 wt % CaO;
   0.10 to 0.85 wt % MgO
   other components, if any, providing the balance up to 100 wt %,
   wherein the sum of $SiO_2$ and CaO is greater than or equal to 98.8 wt % and the other components comprise less than 0.70 wt % $Al_2O_3$, if any; and
   after heat treatment at 1100° C. for 24 hours comprise surface crystal grains with an average crystallite size of 0.90 μm or less.

2. The inorganic fibres of claim 1, comprising 0.01 to less than 0.65 wt % $Al_2O_3$.

3. The inorganic fibres of claim 1, wherein the other components account for at least 0.3 wt % of the composition of the inorganic fibres.

4. The inorganic fibres of claim 1, wherein the sum of $SiO_2$+CaO+MgO is greater than or equal to 99.3 wt % of the fibre composition.

5. The inorganic fibres of claim 1, wherein the sum of $SiO_2$+CaO+MgO+$Al_2O_3$ is greater than or equal to 99.5 wt % of the fibre composition.

6. The inorganic fibres of claim 1, wherein the fibre composition comprises less than 0.80 wt % MgO.

7. The inorganic fibres according to claim 1, wherein the amount of $Al_2O_3$ is less than 0.35 wt %.

8. The inorganic fibres of claim 1, wherein the sum of $SiO_2$ and CaO is greater than or equal to 99.0 wt %.

9. The inorganic fibres of claim 1, wherein the sum of $SiO_2$ and CaO is greater than or equal to 99.1 wt %.

10. The inorganic fibres of claim 1, wherein the sum of $SiO_2$ and CaO is greater than or equal to 99.2 wt %.

11. The inorganic fibres of claim 1, wherein the composition comprises less than 70.0 wt % $SiO_2$.

12. The inorganic fibres according to claim 1, wherein then composition comprises greater than 64.5 wt % $SiO_2$.

13. The inorganic fibres according to claim 1, wherein the composition comprises 65.7 wt % or greater $SiO_2$.

14. Inorganic fibres having a composition comprising:
    61.0 to 70.8 wt % $SiO_2$;
    28.0 to 39.0 wt % CaO;
    0.10 to 0.85 wt % MgO
    other components, if any, providing the balance up to 100 wt %,
    wherein the sum of $SiO_2$ and CaO is greater than or equal to 98.8 wt % and the other components comprise less than 0.70 wt % $Al_2O_3$, if any; and the sum of the other components is in the range 0.05 to 1.0 wt % of the fibre composition, said other components comprising one or more oxides or fluorides of lanthanides, Sr, Ba, Cr, Zr, or combinations thereof.

15. The inorganic fibres according to claim 14, wherein the sum of the other components is in the range 0.1 to 0.8 wt %.

16. Inorganic fibres having a composition comprising:
    65.7 to 69.0 wt % $SiO_2$;
    30.0 to 34.2 wt % CaO;
    0.10 to 0.60 wt % MgO;
    0 to 0.50 wt % $Al_2O_3$; and
    other components, if any, providing the balance up to 100 wt %,
    wherein the sum of $SiO_2$ and CaO is greater or equal to 99.0 wt %.

17. The inorganic fibres according to claim 16, wherein the composition comprises:
    65.7 to 69.0 wt % $SiO_2$;
    30.0 to 34.2 wt % CaO;
    0.10 to 0.45 wt % MgO;
    0 to 0.40 wt % $Al_2O_3$; and
    the sum of $SiO_2$ and CaO is greater or equal to 99.2 wt %.

18. The inorganic fibres according to claim 16, wherein the other components comprise 0 to 0.25 wt % alkali metal oxides.

19. The inorganic fibres according to claim 1, wherein the other components comprise 0 to 0.20 wt % alkali metal oxides.

20. The inorganic fibres according to claim 1, wherein the arithmetic mean fibre diameter is less than 6.0 μm.

21. A thermal insulation comprising inorganic fibres as claimed in claim 1.

22. The thermal insulation according to claim 21 in the form of a blanket of the inorganic fibres.

* * * * *